United States Patent
Brockners et al.

(10) Patent No.: US 11,616,701 B2
(45) Date of Patent: Mar. 28, 2023

(54) VIRTUAL PROXIMITY RADIUS BASED WEB CONFERENCING

(71) Applicant: Cisco Technology, Inc., San Jose, CA (US)

(72) Inventors: Frank Brockners, Cologne (DE); Shwetha Subray Bhandari, Bangalore (IN); Pallavi Kalapatapu, San Jose, CA (US); Enzo Fenoglio, Issy-les-Moulineaux (FR); Wenqin Shao, Versailles (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/181,243

(22) Filed: Feb. 22, 2021

(65) Prior Publication Data

US 2022/0272004 A1 Aug. 25, 2022

(51) Int. Cl.
*H04L 41/22* (2022.01)
*G06F 9/451* (2018.01)
*H04L 41/08* (2022.01)

(52) U.S. Cl.
CPC .............. *H04L 41/22* (2013.01); *G06F 9/452* (2018.02); *H04L 41/08* (2013.01)

(58) Field of Classification Search
CPC ........................ G06F 3/011–17; G06F 3/0481
See application file for complete search history.

(56) References Cited

U.S. PATENT DOCUMENTS

| | | | |
|---|---|---|---|
| 6,559,863 B1* | 5/2003 | Megiddo | H04L 12/1827 348/14.08 |
| 6,772,195 B1 | 8/2004 | Hatlelid et al. | |
| 7,386,799 B1* | 6/2008 | Clanton | A63F 13/12 715/758 |
| 7,840,668 B1* | 11/2010 | Sylvain | A63F 13/54 709/224 |
| 8,026,918 B1* | 9/2011 | Murphy | H04L 67/38 345/473 |
| 8,144,633 B2* | 3/2012 | Yoakum | H04L 65/4015 370/261 |

(Continued)

FOREIGN PATENT DOCUMENTS

DE 102018121566 3/2020

*Primary Examiner* — Ryan F Pitaro
(74) *Attorney, Agent, or Firm* — Lee & Hayes, P.C.

(57) ABSTRACT

Techniques for utilizing a communication system that provides access to a representation of a virtual environment to participants. The communication system may establish connections between personal communication bridge(s) associated with participant(s) interacting within a virtual proximity radius of one another's virtual indicator in the virtual environment. The communication system may cause conversation data to be sent each personal communication bridge associated with a participant that is within the virtual proximity radius of the sender, and cause conversation data to be received via the personal communication bridge of a participant that is within the virtual proximity radius of the sender. The communication system may also analyze data associated with the participant profile(s) and transcribed conversation data from the communication bridges(s) to recommend potential conversations of interest to participant(s).

20 Claims, 8 Drawing Sheets

(56) References Cited

U.S. PATENT DOCUMENTS

| | | | | |
|---|---|---|---|---|
| 2006/0256959 A1* | 11/2006 | Hymes | H04W 4/21 | 379/433.04 |
| 2008/0215994 A1* | 9/2008 | Harrison | A63F 13/42 | 715/757 |
| 2008/0301568 A1* | 12/2008 | Im | G06Q 10/10 | 715/757 |
| 2010/0115426 A1* | 5/2010 | Liu | G06Q 10/107 | 715/757 |
| 2010/0169798 A1* | 7/2010 | Hyndman | A63F 13/12 | 715/757 |
| 2010/0205541 A1* | 8/2010 | Rapaport | G06F 16/285 | 715/753 |
| 2012/0131478 A1* | 5/2012 | Maor | G06Q 10/101 | 715/757 |
| 2012/0290950 A1* | 11/2012 | Rapaport | H04N 21/8358 | 715/753 |
| 2013/0031475 A1* | 1/2013 | Maor | G06Q 10/10 | 715/706 |
| 2013/0246942 A1* | 9/2013 | Merrifield | A61B 5/1124 | 715/757 |
| 2013/0254680 A1* | 9/2013 | Buhr | G06Q 50/01 | 715/753 |
| 2013/0331127 A1* | 12/2013 | Sabatelli | H04W 4/80 | 455/456.3 |
| 2014/0143352 A1* | 5/2014 | Yegnashankaran | H04L 67/306 | 709/206 |
| 2015/0365449 A1* | 12/2015 | Kurata | G06F 3/0486 | 715/757 |
| 2016/0128617 A1* | 5/2016 | Morris | G06Q 50/10 | 434/236 |
| 2016/0197862 A1 | 7/2016 | Moyers | | |
| 2017/0001112 A1* | 1/2017 | Gilmore | A63F 13/40 | |
| 2017/0104866 A1* | 4/2017 | Campbell | G06F 3/04842 | |
| 2020/0265070 A1 | 8/2020 | Rapaport et al. | | |

* cited by examiner

600

602 RECEIVE, AT A NETWORK-BASED COMMUNICATION SYSTEM AND FROM A FIRST USER DEVICE ASSOCIATED WITH A FIRST USER ACCOUNT, A REQUEST TO ACCESS A VIRTUAL ENVIRONMENT

604 PROVIDE THE FIRST USER ACCOUNT WITH ACCESS TO A USER INTERFACE THAT REPRESENTS THE VIRTUAL ENVIRONMENT

606 PROVIDE A FIRST VIRTUAL INDICATOR VIA THE USER INTERFACE, ASSOCIATED WITH THE FIRST USER ACCOUNT, AT A FIRST VIRTUAL LOCATION IN THE VIRTUAL ENVIRONMENT, WHEREIN THE VIRTUAL ENVIRONMENT INCLUDES A PLURALITY OF VIRTUAL INDICATORS ASSOCIATED WITH ADDITIONAL USER ACCOUNTS

608 DETERMINE THAT A SECOND VIRTUAL INDICATOR ASSOCIATED WITH A SECOND USER ACCOUNT IS WITHIN A FIRST VIRTUAL PROXIMITY RADIUS OF THE FIRST VIRTUAL INDICATOR

610 BASED AT LEAST IN PART ON THE SECOND VIRTUAL INDICATOR BEING WITHIN THE FIRST VIRTUAL PROXIMITY RADIUS, CONNECT A FIRST PERSONAL COMMUNICATION BRIDGE ASSOCIATED WITH THE FIRST USER ACCOUNT WITH A SECOND PERSONAL COMMUNICATION BRIDGE ASSOCIATED WITH A SECOND USER ACCOUNT, WHEREIN COMMUNICATION DATA CAN BE COMMUNICATED BETWEEN THE FIRST USER DEVICE AND A SECOND USER DEVICE ASSOCIATED WITH THE SECOND USER ACCOUNT VIA THE FIRST PERSONAL COMMUNICATION BRIDGE AND THE SECOND PERSONAL COMMUNICATION BRIDGE

```
┌─────────────────────────────────────────────────────────┐
│ SEND, FROM A FIRST USER DEVICE ASSOCIATED WITH A FIRST  │
│ USER ACCOUNT AND TO A NETWORK-BASED COMMUNICATION       │
│ SYSTEM, A REQUEST TO ACCESS A VIRTUAL ENVIRONMENT       │
│                         702                             │
└─────────────────────────────────────────────────────────┘
                            │
                            ▼
┌─────────────────────────────────────────────────────────┐
│ RECEIVE, AT THE FIRST USER DEVICE AND FROM THE          │
│ NETWORK-BASED COMMUNICATION SYSTEM, ACCESS TO A USER    │
│ INTERFACE THAT REPRESENTS THE VIRTUAL ENVIRONMENT,      │
│ WHEREIN THE VIRTUAL ENVIRONMENT INCLUDES A PLURALITY    │
│ OF VIRTUAL INDICATORS ASSOCIATED WITH ADDITIONAL USER   │
│                       ACCOUNTS                          │
│                         704                             │
└─────────────────────────────────────────────────────────┘
                            │
                            ▼
┌─────────────────────────────────────────────────────────┐
│ RECEIVE, VIA THE USER INTERFACE, A FIRST VIRTUAL        │
│ INDICATOR, ASSOCIATED WITH THE FIRST USER ACCOUNT, AT   │
│ A FIRST VIRTUAL LOCATION IN THE VIRTUAL ENVIRONMENT,    │
│ THE FIRST VIRTUAL INDICATOR HAVING A FIRST VIRTUAL      │
│                  PROXIMITY RADIUS                       │
│                         706                             │
└─────────────────────────────────────────────────────────┘
                            │
                            ▼
┌─────────────────────────────────────────────────────────┐
│ DETERMINE THAT A FIRST CONNECTION BETWEEN A FIRST       │
│ PERSONAL COMMUNICATION BRIDGE ASSOCIATED WITH THE       │
│ FIRST USER ACCOUNT AND A SECOND PERSONAL COMMUNICATION  │
│ BRIDGE ASSOCIATED WITH A SECOND USER ACCOUNT HAS BEEN   │
│ ESTABLISHED, THE SECOND USER ACCOUNT BEING ASSOCIATED   │
│ WITH A SECOND VIRTUAL INDICATOR THAT IS WITHIN THE      │
│ FIRST VIRTUAL PROXIMITY RADIUS OF THE FIRST VIRTUAL     │
│ INDICATOR, WHEREIN COMMUNICATION DATA CAN BE            │
│ COMMUNICATED BETWEEN THE FIRST USER DEVICE AND A        │
│ SECOND USER DEVICE ASSOCIATED WITH THE SECOND USER      │
│ ACCOUNT VIA THE FIRST PERSONAL COMMUNICATION BRIDGE     │
│ AND THE SECOND PERSONAL COMMUNICATION BRIDGE            │
│                         708                             │
└─────────────────────────────────────────────────────────┘
```

FIG. 7

VIRTUAL PROXIMITY RADIUS BASED WEB CONFERENCING

TECHNICAL FIELD

The present disclosure relates generally to utilizing a communication system that provides a user interface, representing a virtual environment, to establish connections(s) between personal communication bridge(s) of participant device(s) having an associated virtual indicator that is within a virtual proximity radius of one another in the virtual environment and analyzing data associated with the participant profile(s) and the personal communication bridge(s) to recommend potential conversations of interest to participant(s).

BACKGROUND

Conferences allow for participants to engage in both formal interactions, such as conference presentations, and informal interactions, such as hallway conversations, social events, coffee-breaks, cocktail hours, etc. Due to the ease of access, scalability, and growth of computing infrastructure, these conferences are increasingly being held as virtual events. Current solutions that are utilized to host virtual conferences primarily focus on the formal interactions, and often lack any informal interaction. For example, most virtual conferences are set up to follow a presentation or an agenda and primary speaker(s) leading the presentation. As such, participants may find the current virtual conferences less engaging and insufficient as an alternate to traditional in-person conferences.

A key attribute of an informal interaction at a conference is the ability for a participant to engage in multiple conversations throughout the event with various people. In traditional in-person conferences, participants may introduce themselves to like-minded people that they have not yet met to exchange ideas, beliefs, and values through conversation. For example, a participant may begin conversing with other participants around them and then move throughout the conference setting having conversations with additional participants that are near them. Since the current virtual conferences mentioned above focus primarily on the formal interactions, participants may not be allocated the time or offered an intuitive way to engage in conversations and meet like-minded people, ultimately resulting in a lack of engagement and a poor user experience for a participant of a virtual a conference event.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for a network-based communication system to provide a participant with access to a user interface that represents a virtual environment and a virtual indicator having a virtual proximity radius and establish a connection(s) between a personal communication bridge associated with the participant and additional personal communication bridge(s) associated with additional participants within the virtual proximity radius of the virtual indicator.

FIG. 7 illustrates a flow diagram of an example method for a user device to send a request to a network-based communication system to access a virtual environment, receive access to a user interface that represents the virtual environment and a virtual indicator having a virtual proximity radius, and determine that a first connection has been established between a first personal communication bridge of a user device associated with the participant and additional personal communication bridges of additional user devices associated with the additional participants that are within the virtual proximity radius of the participant's virtual indicator.

DESCRIPTION OF EXAMPLE EMBODIMENTS

Overview

Figure 1:
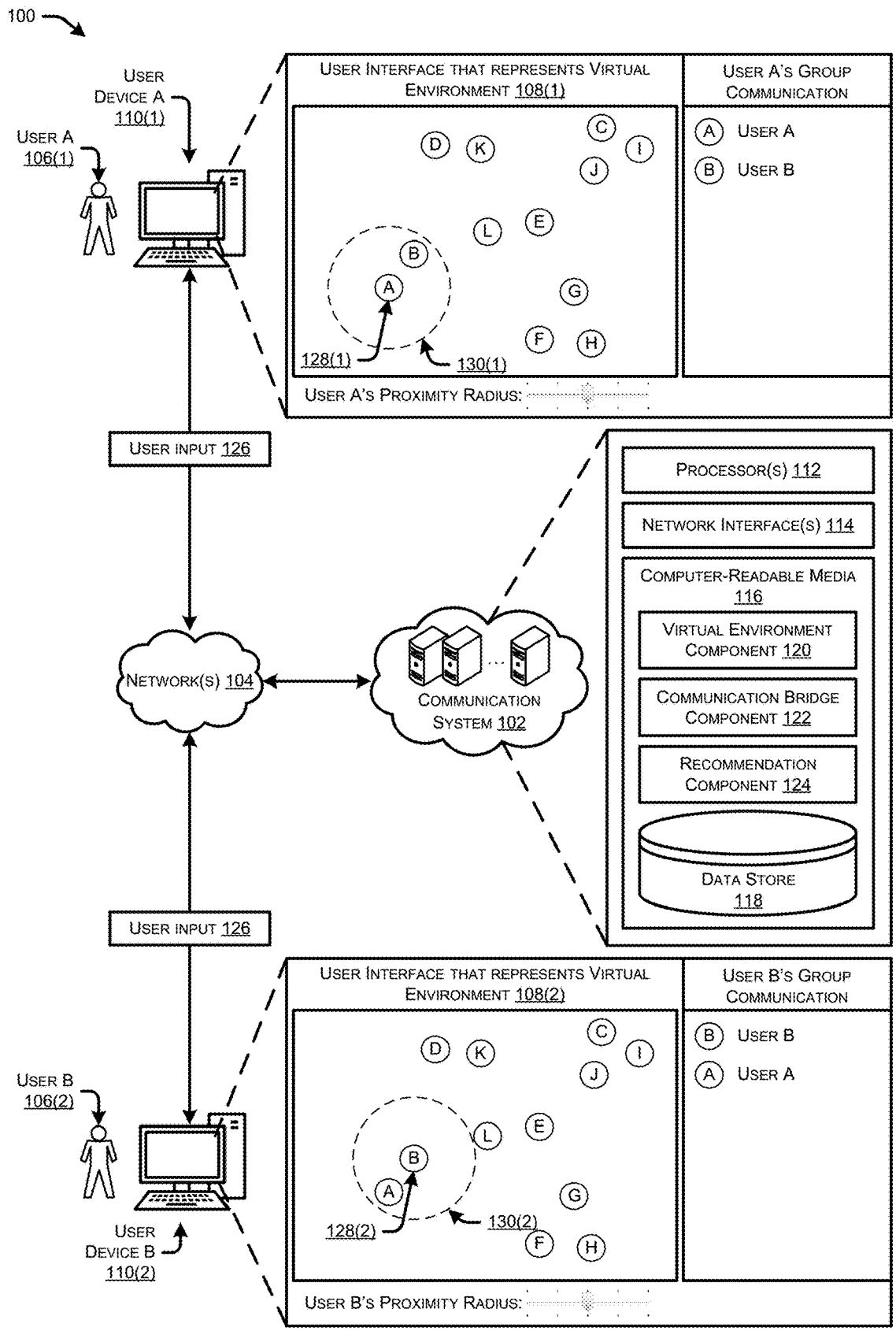
FIG. 1 illustrates a system-architecture diagram of an example environment that includes a network-based communication system for facilitating a virtual proximity radius based connection between a personal communication bridge of a first user device established via one or more network(s) and associated with a first user accessing a first user interface that represents a virtual environment and a second personal communication bridge of a second user device associated with a second user accessing a second user interface that represents the virtual environment.

This disclosure describes a method of utilizing a communication system that provides a user interface, representing a virtual environment, to establish connection(s) between personal communication bridge(s) of participant device(s) having an associated virtual indicator that is within a virtual proximity radius of one another in the virtual environment and analyzing data associated with the participant profile(s)

and the personal communication bridge(s) to recommend potential conversations of interest to participant(s). The method includes receiving, at a network-based communication system and from a first user device associated with a first user account, a request to access a virtual environment. The method may further include providing the first user account with access to user interface that represents the virtual environment. The method may further include providing a first virtual indicator via the user interface, associated with the first user account, at a first virtual location in the virtual environment. The virtual environment may include a plurality of virtual indicators associated with additional user accounts. The method may further include determining that a second virtual indicator associated with a second user account is within a first virtual proximity radius of the first virtual indicator. The method may further include, connecting a first personal communication bridge with a second personal communication bridge of a second user device associated with the second user account based at least in part on the second virtual indicator being within the first virtual proximity radius. Communication data may be communicated between the first user device and the second user device via the first personal communication bridge and the second personal communication bridge.

Additionally, or alternatively, the method includes sending, from a first user device associated with a first user account and to a network-based communication system, a request to access a virtual environment. The method may further include receiving, at the first user device and from the network-based communication system, access to a user interface that represents the virtual environment. The virtual environment may include a plurality of virtual indicators associated with additional user accounts. The method may further include receiving, via the user interface, a first virtual indicator, associated with the first user account, at a first virtual location in the virtual environment, the first virtual indicator having a first virtual proximity radius. The method may further include determining that a first connection between a first personal communication bridge of the first user device and a second personal communication bridge of a second user device associated with a second user account has been established. The second user account may be associated with a second virtual indicator that is within the first virtual proximity radius of the first virtual indicator. Communication data can be communicated between the first user device and the second user device via the first personal communication bridge and the second personal communication bridge.

Additionally, the techniques described herein may be performed by a system and/or device having non-transitory computer-readable media storing computer-executable instructions that, when executed by one or more processors, performs the method described above.

Example Embodiments

As discussed above, conferences rely on both formal interactions (conference presentations) and informal interactions (hallway conversations, social events, coffee-breaks, cocktail hours, etc.) to engage participants in conversation. While utilizing current solutions to host a virtual conference may be effective for engaging participants in the formal interactions of the conference, such as a presentation or an agenda, participants may not be allocated time and/or offered an intuitive way to engage in conversations and meet like-minded people, which may ultimately result in a lack of engagement or a poor user experience for a participant of a virtual conference event.

This disclosure describes techniques for a communication system to connect personal communication bridge(s) between user device(s), associated with a user account(s), and provide a participant associated with a user account access to a virtual environment, including a virtual participant indicator having a virtual proximity radius, to the user account so that the participant may move the virtual participant indicator about the virtual environment and/or adjust the virtual proximity radius to establish connections with additional participant(s) that are within the virtual proximity radius of virtual participant indicator of the participant. The connections between personal communication bridge(s) may be created by connecting the personal bridge of the user account associated with the participant to additional personal bridges(s) of additional user account(s) associated with additional participant(s), such that communication data may be communicated via the personal communication bridge(s). The virtual environment may be represented by coordinates, such as, for example, two-dimensional coordinates configured to define a two-dimensional space represented by the virtual environment and/or three-dimensional coordinates configured to define a three-dimensional virtual space represented by the virtual environment. Additionally, or alternatively, the virtual environment may be associated with, configured as, and/or may comprise, a virtual conference room, a communication interface, and/or any other means for connecting computing devices in a manner that allows an exchange of data. Additionally, or alternatively, communication system may analyze the communication data of the personal communication bridge(s), metadata indicating preferences and/or interests associated with the user profile(s), and/or the connection quality of a participant to generate and provide recommendations to move to a new location in the virtual environment associated with a potential conversation of interest to a participant. The communication data may include any data that is communicated between devices associated with participants, such as, for example, a transcript of audio data, visual cues identified in video data, an accent of a speaker determined from the audio data, a language of the speaker determined from the audio data, a gender of the speaker determined from the audio data and/or user account data, an attitude or tone of the speaker determined from the audio data, and/or a mood determined from the audio data and/or the attitude or tone of the speaker. According to the techniques and mechanisms described herein, an example virtual proximity radius-based web conferencing environment may include a communication system and one or more user device(s). The user device(s) may be utilized by one or more participant(s) accessing the communication system via one or more user account(s). For example, a participant may interact with, connect to, or otherwise participate in, the communication system via a user account that has been provided access to a virtual environment.

The communication system may configure a personal communication bridge in various ways. In some examples, a personal communication bridge may be configured as a private conference room associated with a user account and/or may comprise an address associated with a user account, an enterprise associated with a user account, and/or the communication system. In some examples, the address may be configured as a static address that is associated with a user account, an enterprise, and/or the communication system (e.g., enterprise.app.com/meet/username). Additionally, or alternatively, the address may be configured as a dynamic address associated with a private conference room (e.g., enterprise.app.com/meet/room_number) and/or random address associated with the an enterprise and/or the communication system (e.g., enterprise.app.com/meet/random_address). In some examples, the random address may be generated each time a user device accesses the communication system.

A participant may utilize a user device to access the communication system via a user account. In some examples, the one or more user devices may utilize one or more network(s) to exchange data with the communication system. For example, a first user device associated with a first user account may send, to the network-based communication system, a request to access a virtual environment. In some examples, the communication system may connect a personal bridge associated with the user device to the virtual environment. For example, the personal bridge may be configured as a reservation on a static server associated with the communication system, such that, the user device is connected, but data may not be transmitted to and/or from the user device until a connection is established between the first personal bridge and an additional personal bridge associated with an additional user device.

In some examples, the virtual environment may be hosted and/or maintained by the communication system. Additionally, or alternatively, the communication system may provide the first user account access to a user interface that represents the virtual environment. In some examples, the virtual environment may include a plurality of virtual participant indicators associated with additional user accounts that are accessing the virtual environment. Additionally, or alternatively, the communication system may provide the first user account with a first virtual indicator associated with the first user account. In some examples, the first virtual indicator may be at a particular location represented by virtual coordinates of the virtual environment. Additionally, or alternatively, the first virtual indicator may include a virtual proximity radius. In some examples, the virtual proximity radius may be configured as a radius about a virtual indicator, such that, for example, as the virtual indicator moves about the virtual environment so does the virtual proximity radius. Additionally, or alternatively, the virtual proximity radius may be configured as a virtual proximity zone, such that, for example, the associated virtual indicator may move freely about the virtual proximity radius/zone without the virtual proximity radius/zone moving. In some examples, the virtual proximity radius of a virtual indicator may be a default virtual proximity radius assigned upon joining the virtual environment, may be increased and/or decreased by a participant interacting with the virtual environment, and/or may be indicated by a preference of a user account. In some examples, the default virtual proximity radius may be configured to represent a comfortable conversation distance and/or to promote speech exchange and social interactions based on the associated virtual environment. Additionally, or alternatively, the communication system may establish a first personal bridge with the first user device on behalf of the first user account. In some examples, the first personal bridge may be configured as a private and/or personal bridge associated with the first user account.

The communication system may make various determinations with respect to the participants in the virtual environment. In some examples, the communication system may determine that the first virtual indicator and a second virtual indicator are close to each other in the virtual environment, such that a connection should be created to exchange communication data between the first user device and a second user device associated with a second user account associated with the second virtual indicator. For example, the communication system may determine that the second virtual indicator associated with the second user account has virtual coordinates that are within the virtual proximity radius of the first virtual indicator. In some examples, the communication system may connect the first personal bridge of the first user account with a second personal bridge of the second user account. In some examples, conversation data (also referred to as communication data), such as, for example, audio data, text data, and/or video data, can be communicated between the first user device, the second user device, and/or additional user devices associated with user accounts via the first personal communication bridge, the second personal communication bridge, and/or additional personal communication bridges.

The communication system may connect personal communication bridge(s) in various ways. In some examples, a connection between personal communication bridge(s) may be open, such that, anyone may join the conversation by moving to a location that is sufficiently proximal to members included in the conversation. Additionally, or alternatively, the connection between the personal communication bridge(s) may be closed, such that, no other participants other than those included in the conversation may join. Additionally, or alternatively, the connection between personal communication bridge(s) may be controlled, such that, anyone who wishes to join the conversation using their personal communication bridge may do so by moving to a location that is sufficiently proximal to virtual indicators corresponding to members included in the conversation, and request to join. In some examples, a virtual representation of a connection between personal communication bridge(s) may provide an indication as to whether a conversation is open, controlled, and/or provide, such as, for example, providing a color indicator, a text indicator, or the like.

In some examples, each user account that joins the virtual environment may join and/or connect a personal communication session (also referred to as a personal bridge and/or room) with the communication system. Take for example, an example environment having a virtual environment including a first virtual indicator associated with a first user account and having a first virtual proximity radius, and a second virtual indicator associated with a second user account and having a second virtual proximity radius. In some examples, the first user account may have a first personal bridge connected to a virtual environment associated with the communication system and the second user account may have a second personal bridge connected to the virtual environment associated with the communication system. In some examples, a participant associated with the second user account may provide input, to a second computing device associated with the second user account, representing a move to a particular location in the virtual environment. Additionally, or alternatively, upon accessing the virtual environment, the second user account may be assigned to a default location in the virtual environment. Following the user input and/or the default location, the second virtual indicator may move and/or be located at the particular location in the virtual environment and the particular location may have virtual coordinates that are within the first virtual proximity radius of the first virtual indicator. In some examples, the communication system may connect the first personal bridge and the second personal bridge. Additionally, or alternatively, the communication system may cause the second personal bridge to join the first personal bridge as a result of the second virtual indicator being within the first virtual proximity radius of the first virtual indicator. In some examples, a first connection is established including the first personal bridge and the second personal bridge. Additionally, or alternatively, the communication system may determine that the first virtual indicator is within the second virtual proximity radius of the second virtual indicator and may cause the first personal bridge to connect to the second personal bridge as a result of the first virtual indicator being within the second virtual proximity radius of the second virtual indicator. In some examples, a second connection is established including the second personal bridge and the first personal bridge.

The communication system may utilize the personal communication bridge(s) to communicate communication data between a first user device associated with the first user account and a second user device associated with the second user account. In some examples, the communication system may be configured such that participants may utilize a user device to send communication data to each personal communication bridge (or personal conference room/bridge) within a threshold proximity of an associated virtual indicator. Additionally, or alternatively, the communication system may be configured such that participants receive communication data through only the personal bridge associated with the participants user account (e.g., the participants personal conference room/bridge). In some examples, a first user device associated with the first user account may send communication data to all of the personal communication bridges within a threshold proximity and may receive all communication data via the first personal communication bridge. Additionally, or alternatively, a second user device associated with the second user account may send all communication data to all of the personal bridge(s) within a threshold proximity and may receive all communication data via the second personal bridge. For example, when the participant associated with the first user account inputs communication data such as, for example, speech, text, video, files, and/or any type of media capable of being communicated via a data representation, the first user account may send the communication data to all of the personal bridges included in the first connection, such as, for example, the first personal bridge and/or the second personal bridge. The communication system may be configured such that each participant associated with the connection, such as the first personal bridge, receives communication data via the personal conference bridge associated with the user account. For example, the second user account may receive the communication data from the first user account via the second personal bridge. Additionally, or alternatively, the communication system may determine the sender of the communication data and may not send the communication data to the personal conference bridge associated with the user account determined to be the sender. For example, the first user account may be determined to be the sender, and the communication system may determine to not send the communication data from the first user account to the first user account via the first personal bridge, such that the first user account does not receive an echo of the communication data they just sent.

The communication system may further be configured to generate and/or provide recommendations to user accounts participating in a virtual group communication environment. For example, the communication system may generate a recommendation to move to a particular location represented by virtual coordinates in the virtual environment. In some examples, a participant associated with the first user account may provide input, to a first computing device associated with the first user account, representing a request to receive a recommended move to join a conversation and/or connection associated with personal communication bridges of additional participants. The first computing device may send the request to the communication system and the communication system may generate a recommendation to move the first virtual indicator. In some examples, the recommendation may be a recommended move to a new location that that ensures that the first virtual indicator is within a third virtual proximity radius of a third virtual indicator and/or will result in the first user account joining a new conversation that may be of interest to the participant associated with the first user account. For example, the recommended location associated with the new conversation may be based on various data and/or various determinations made by the communication system. In some examples, the recommendation may be based at least partly on a similarity between the content of conversations associated with user accounts of participants, metadata associated with a participant's user profile, and/or one or more environmental measurements.

As mentioned above, the communication system may generate a recommendation based on a similarity between the context associated with user accounts and/or content of conversations associated with participants. For example, the conversation system may generate a similarity score between first context associated with a first user account and second context associated with a second user account. In some examples, the context may be based on content associated with the user accounts. For example, content associated with a user account may include a conversation history associated with the user account, a spoken language of the participant associated with the user account, an accent of the participant associated with the user account, a gender of the participant associated with the user account, a speech style (e.g., speaking mannerisms, tone, speed/rate at which a participant speaks, gestures, etc.), a connection quality associated with the user account, and/or social media data associated with the user account (e.g., data associated with a participant's FACEBOOK®, LINKEDIN®, TWITTER®, etc.). Additionally, or alternatively, the communication system may generate a similarity score between first content transcribed from first conversation data exchanged via a first personal bridge associated with a first user profile and second content transcribed from second conversation data exchanged via a second personal bridge associated with a second user profile. In some examples, the communication system may utilize the conversation data to generate and/or determine various data for generating a similarity score, such as, for example, a document including a transcript of recent conversation(s) associated with a user account, a document including a full historical transcript associated with a user account (e.g., a transcript including up to the complete conversation history associated with a user profile), and/or a measure of speech exchange (e.g., a measure of how frequent a participant is talking in group conversations). In some examples, the full historical transcript may be generated in a number of steps. For example, the full historical transcript may follow an evolution model in which the evolution of participant groups that form in the virtual space is driven by most recent transcript excerpts. Additionally, or alternatively, the full historical transcript may be generated by a simple aggregation of all of the transcripts of the most recent conversation(s) associated with a user account.

In some examples, the communication system may compute the similarity between two documents using various approaches, such as, for example, a Kolmogorov-based similarity (normalized compression distance, normalized information distance, etc.), a classic NLP-based sentence similarity (Doc2Vec, Sent2Vec, Word Mover's Distance (WMD), etc.), and/or an advanced NLP-based sentence similarity (Bidirectional Encoder Representations from Transformers (BERT), Sentence Bidirectional Encoder Representations from Transformers (S-BERT), Universal Sentence Encoder (USE), etc.). Additionally, or alternatively, the communication system may compute the similarity between the measure of speech exchange associated with two user profiles, such as, for example, a measure of how much a participant is contributing in conversation data. For example, the communication system may generate a recommendation based on two user profiles having a similar measure of speech exchange, such that, the two user profiles contributed to previous conversations at a substantially similar rate.

Additionally, or alternatively, the communication system may generate a recommendation based at least partly on metadata associated with user profiles. For example, a user profile may include metadata indicating personal interests and/or preferences associated with a participant. Additionally, or alternatively, the communication system may generate derived data indicating additional interests associated with a user account by leveraging the metadata and/or transcribed conversation data associated with a user account. In some examples, the communication system may generate the derived data utilizing various conversational artificial intelligence (AI) platforms, such as, for example, Mind-Meld. The communication system may then utilize the metadata associated with the user profile and/or the derived data associated with the user profile to generate the recommendations. Additionally, or alternatively the communication system may utilize the metadata and/or the derived data in combination with the transcribed conversation data to compute the similarity score.

Additionally, or alternatively, the communication system may generate a recommendation based at least partly on one or more environmental measurements. For example, the communication system may determine a level of connectivity and/or a connection strength associated with a personal bridge and/or a user profile. In some examples, the communication system may determine if a level of connectivity and/or connection strength associated with a personal bridge and/or a user profile meets and/or exceeds a threshold level of connectivity and/or connection strength, such as to ensure the quality of a personal communication bridge and the quality of experience (QoE). In some examples, the communication system may then utilize the environmental measurement(s), such as, for example, the level of connectivity and/or connection strength associated with a personal bridge and/or a user profile, the metadata and/or derived data, and/or the transcribed conversation data in any combination to compute the similarity score.

The communication system may include one or more physical server(s) that may execute various operations in communication with one another. In some examples, a physical server of the communication system may include various components, such as, for example, one or more processor(s), one or more network interface(s), and/or one or more computer-readable media. The one or more computer-readable media may store instructions to operate one or more components and/or a data store. For example, the computer-readable media may include a virtual environment component, a communication bridge component, and/or a recommendation component. Additionally, or alternatively, the computer-readable media may include a data store for storing data utilized and/or generated by the communication system, such as, for example, user account data, historical data, transcribed conversation data, and/or performance data. In some examples, the communication system may utilize the various components and the data stored in the data store to make the various determinations and/or generate the data described above.

The virtual environment component may be configured to generate and/or maintain the virtual environment, a representation of the virtual environment (e.g., a user interface representing the virtual environment), and/or the virtual indicators, virtual proximity radii, and/or virtual coordinates associated with the virtual environment. For example, the virtual environment component may be configured to generate the virtual environment. As mentioned above, the virtual environment may be a one-dimensional virtual environment represented by one-dimensional coordinates, a two-dimensional virtual environment represented by two-dimensional coordinates, a three-dimensional virtual environment represented by three-dimensional coordinates, and/or any dimension of virtual environment represented by any dimension of virtual coordinates. Additionally, or alternatively, the virtual environment component may be configured to generate and/or maintain the virtual indicators representing user accounts that have accessed the virtual environment. In some examples, the virtual environment component may be configured to receive commands from user devices representing a move to a particular location in the virtual environment represented by coordinates. Additionally, or alternatively, the virtual environment component may be configured to determine if a virtual indicator is within a virtual proximity radius of another virtual indicator. In some examples, the virtual environment component may make such a determination using the virtual coordinates, virtual indicators, and/or the virtual proximity radius. Additionally, or alternatively, the virtual environment component may be configured to generate a representation of the virtual environment, such that, the virtual environment component may generate a user interface (UI) including the representation of the virtual environment for display on the computing device(s) associated with user account(s).

The UI(s) may be configured to receive input from a computing device associated with a user account. In some examples, the computing device associated with the user account may be configured to receive input in a number of ways, such as, for example, touch input and/or input received from a peripheral device communicatively coupled to the computing device. The communication system may transmit one or more UI(s) to a computing device associated with a user account over a network. In some examples, the virtual environment component may transmit a UI that corresponds to a current virtual environment in which a user account has joined. In some examples, the UI's may include the virtual environment in which the user has joined (including a plurality of virtual indicators associated with user accounts that have joined the virtual environment), an indication of a virtual indicator associated with the user account, an indication of the virtual proximity radius of the virtual indicator, an indication of user accounts having virtual indicators within the virtual proximity radius of the virtual indicator (e.g., a listing of the additional user accounts that have entered the personal conference room of the user account), a tag indicating a particular topic associated with one or more personal communication bridge(s) (e.g., a word that best describes the general topic of conversation of a personal communication bridge, determined by the system), a slider and/or other means for adjusting the virtual proximity radius of the virtual indicator, and/or a recommend move button.

Additionally, or alternatively, the UI(s) may be configured to provide a hallway view, including the representation of the virtual environment and/or a room view, providing a video chat view of the current virtual environment. For example, a user may be displayed the hallway view to navigate the representation virtual environment with a respective virtual indicator. Additionally, or alternatively, a user may be displayed the room view to engage in a voice chat, text, chat, and/or video chat with other users included in the virtual environment.

The communication bridge component may be configured to establish the personal communication bridges associated with a virtual environment. In some examples, the communication bridge component may be configured to transmit the conversation data via the communication sessions (e.g., personal conference bridges). For example, the communication bridge component may be configured to transmit conversation data from a first user account to personal bridges associated with each additional user account that falls within the virtual proximity radius of a first virtual indicator associated with the first user account. Additionally, or alternatively, the communication bridge component may be configured such that a user account receives conversation data via the personal bridge associated with the user account. Additionally, or alternatively, the communication bridge component may be configured to determine if conversation data was received from the same account that sent the conversation data. For example, a first user account sending conversation data to personal bridge(s) associated with additional accounts within the virtual proximity radius of a first virtual indicator associated with the first user account may not receive the conversation data via the personal bridge associated with the first user account, such as to prevent echoing conversation data back to the sender, thus improving user experience.

The recommendation component may be configured generate and/or provide the recommendations, described above, to user account(s). Additionally, or alternatively, the recommendation component may be configured to receive commands from user devices representing a request for a recommendation to move to a new location and/or join a new conversation that may be of interest to the participant. In some examples, the recommendation component may generate recommendations based at least partly on a similarity between the content of conversations associated with participants, metadata associated with a participant's user profile, and/or one or more environmental measurements. Additionally, or alternatively, the recommendation component may generate a similarity score based at least partly on the content of conversations associated with participants, metadata associated with a participant's user profile, and/or one or more environmental measurements. In some examples, the recommendation component may generate the recommendation based at least partly on the similarity score.

Additionally, or alternatively, the recommendation component may be configured to generate various tiered virtual proximity radius increase/decrease recommendations, such that a user's virtual proximity radius may be increased or decreased to include/exclude various participants from a conversation. For example, the recommendation component may recommend a first increase in a virtual proximity radius from a virtual indicator such that, for example, 1 additional user is included in the conversation. The recommendation component may also recommend a second increase in a virtual proximity radius from the virtual indicator that is greater than the first increase, such that, for example, 2 additional users are included in the conversation. It should be appreciated that the recommendation component may generate any number of virtual proximity increase and/or decrease recommendations to include and/or exclude any number of users from the conversation.

Although the techniques described as being implemented utilizing a communication system, including computing servers, data centers, and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to virtual conferencing events. For example, the techniques described herein may allow for the creation of a semantic representation for a group of participants surrounding a participant at a given point in time to a virtual conferencing environment in an intuitive manner. For example, participants of a virtual conferencing event may engage in conversations in an ad-hoc manner by moving an associated virtual indicator within a threshold proximity radius of other virtual indicators. Further, a recommendation component may find additional participants in the room that may be of interest to a participant (e.g., participants that are like-minded, share similar interests, and/or have similar user account context and/or conversation transcripts).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram of an example network-based communication environment 100 that includes a network-based communication system 102 for facilitating a virtual proximity radius based connection between a first personal communication bridge of a first user device associated with a first user 106(1) accessing a first user interface that represents a virtual environment 108(1) and a second personal communication bridge of a second user 106(2) accessing a second user interface that represents the virtual environment 108(1).

The network-based communication system 102 may provide on-demand availability of computing system resources of physical server(s) that may include various components, such as, for example, one or more processor(s) 112, one or more network interface(s) 114 for communicating with the one or more user device(s) 110, and/or one or more computer-readable media 116. The one or more computer-readable media 116 may store instructions to operate one or more components and/or a data store 118. For example, the computer-readable media 116 may include a virtual environment component 120, a communication session component 122, and/or a recommendation component 124. Additionally, or alternatively, the computer-readable media 116 may include a data store 118 for storing data utilized and/or generated by the communication system, such as, for example, user account data, historical data, transcribed conversation data, and/or performance data.

The users 106 may provide input data 126 via the network(s) 104 to interact with the network-based communication system 102 running on the servers. For example, the users 106 may submit requests to process data, retrieve data, store data. Additionally, or alternatively, the users 106 may transmit conversation data via the one or more networks 104 to the communication system 102 and/or one or more user devices 110.

User device A 110(1) associated with a first user account may send, to the network-based communication system 102, a request to access a virtual environment. In some examples, the virtual environment may be hosted and/or maintained by the communication system 102. Additionally, or alternatively, the communication system 102 may provide the first user account access to a first representation of the virtual environment 108(1). In some examples, the representation virtual environment 108(1) may include a plurality of virtual participant indicators (B-L) associated with additional user accounts that are accessing the virtual environment. Additionally, or alternatively, the communication system may provide the first user account with a first virtual indicator (A) 128(1) associated with the first user account. In some examples, the first virtual indicator 128(1) may be at a particular location represented by virtual coordinates of the virtual environment. Additionally, or alternatively, the first virtual indicator 128(1) may include a first virtual proximity radius 130(1). In some examples, a virtual proximity radius 130 of a virtual indicator 128 may be a default virtual proximity radius 130 assigned upon joining the virtual environment, may be increased and/or decreased by a participant 106 interacting with the virtual environment, and/or may be indicated by a preference of a user account. In some examples, the default virtual proximity radius 130 may be configured to represent a comfortable conversation distance and/or to promote speech exchange and social interactions based on the associated virtual environment. Additionally, or alternatively, the communication system 102 may establish a first communication session with user device A 110(1) on behalf of the first user account. In some examples, the first communication session may be configured as a private bridge associated with the first user account.

The communication system 102 may make various determinations with respect to the participants 106 in the virtual environment. In some examples, the communication system 102 may determine that the first virtual indicator 128(1) and a second virtual indicator 128(2) are close to each other in the virtual environment, such that a connection should be established to exchange communication data between user device A 110(1) and user device B 110(1) associated with a second user account associated with the second virtual indicator 128(1) via one or more personal communication bridge(s). For example, the communication system 102 may determine that the second virtual indicator 128(2), associated with the second user account, has virtual coordinates that are within the first virtual proximity radius 130(1) of the first virtual indicator 128(1). In some examples, the communication system 102 may connect the second communication bridge of the second user account to a first communication bridge of the first user account. In some examples, conversation data can be communicated between user device A 110(1), user device B(1), and/or additional user devices associated with user accounts via the first personal communication bridge and the second personal communication bridge. Additionally, or alternatively, the communication system 102 may determine that the first virtual indicator 128(1), associated with the first user account, has coordinates that are within a second virtual proximity radius 130(2) of the second virtual indicator 128(2). In some examples, the communication system may connect the first communication session of the first user account to a second communication session of the second user account. In some examples, conversation data may be communicated between user device A 110(1), user device B 110(2), and/or additional user device associated with user accounts via the first communication bridge, the second personal communication bridge, and/or additional communication bridge(s).

The communication system 102 may utilize the virtual environment component 120 to perform various operations. For example, the virtual environment component 120 may be configured to generate and/or maintain the virtual environment, a representation of the virtual environment 108 (e.g., a user interface representing the virtual environment), and/or the virtual indicators 128, virtual proximity radiuses 130, and/or virtual coordinates associated with the virtual environment. For example, the virtual environment component 120 may be configured to generate the virtual environment. In some examples, virtual environment may be a two-dimensional virtual environment represented by two-dimensional coordinates and/or a three-dimensional virtual environment represented by three-dimensional coordinates. Additionally, or alternatively, the virtual environment component 120 may be configured to generate and/or maintain the virtual indicators 128 representing user accounts that have joined the virtual environment. In some examples, the virtual environment component 120 may be configured to receive commands from user devices 110 representing a move to a particular location in the virtual environment represented by coordinates. Additionally, or alternatively, the virtual environment component 120 may be configured to determine if a virtual indicator 128 is within a virtual proximity radius 130 of another virtual indicator 128. In some examples, the virtual environment component 120 may make such a determination using the virtual coordinates, virtual indicators 128, and/or the virtual proximity radius 130. Additionally, or alternatively, the virtual environment component 120 may be configured to generate a representation of the virtual environment 108, such that, the virtual environment component 120 may generate a user interface (UI) including the representation of the virtual environment 108 for display on the computing device(s) 110 associated with user account(s).

The UI(s) may be configured to receive input from a computing device 110 associated with a user account. In some examples, the computing device 110 associated with the user account may be configured to receive input in a number of ways, such as, for example, touch input and/or input received from a peripheral device communicatively coupled to the computing device 110. The communication system 102 may transmit one or more UI(s) to a computing device 110 associated with a user account over the network 104. In some examples, the virtual environment component 120 may transmit a UI that corresponds to a current virtual environment in which a user account has joined. In some examples, the UI's may include a representation of the virtual environment 108 in which the user has joined (including a plurality of virtual indicators associated with user accounts that have joined the virtual environment), an indication of a virtual indicator 128 associated with the user account, an indication of the virtual proximity radius 130 of the virtual indicator 128, an indication of user accounts having virtual indicators 128 within the virtual proximity radius 130 of the virtual indicator 128 (e.g., a listing of the additional user accounts that have entered the personal conference room of the user account), a slider and/or other means for adjusting the virtual proximity radius 130 of the virtual indicator 128, and/or a recommend move button.

Additionally, or alternatively, the virtual environment component 120 may be configured to determine if connections between personal communication bridge(s) should be established. For example, the virtual environment component 120 may be configured to establish connections between personal communication bridge(s) in various ways. In some examples, a connection may be configured to be open, such that, anyone may join the connection and/or conversation by moving to a location that is sufficiently proximal to members included in the conversation. Additionally, or alternatively, the connection may be configured to be controlled, such that, anyone who wishes to join the connection and/or conversation may do so by moving to a location that is sufficiently proximal to members included in the conversation, and request to join the conversation. In some examples, each user account that joins the virtual environment may join and/or activate a personal communication session (also referred to as a personal conference bridge and/or room) with the communication system 102.

Take for example, an example group communication environment 100 including a first user device 110(1) displaying a first representation of a virtual environment 108(1) including a first virtual indicator 128(1) associated with a first user account and having a first virtual proximity radius 130(1), and/or one or more additional virtual indicators association with additional user accounts. Additionally, or alternatively, the group communication environment 100 may include a second user device 110(2) displaying a second representation of the virtual environment 108(2) including a second virtual indicator 128(2) associated with a second user account and having a second virtual proximity radius 130(2), and/or one or more additional virtual indicators association with additional user accounts. In some examples, the first user account may have a first communication session established with the communication system 102 and the second user account may have a second communication session established with the communication system 102.

In some examples, a participant 106(2) associated with the second user account may provide input, to the second computing device 110(2) associated with the second user account, representing a move to a particular location in the virtual environment. Additionally, or alternatively, upon accessing the virtual environment, the second user account may be assigned to a default location in the virtual environment. In some examples, the default location may be a random location in the virtual environment (e.g., random coordinates generated by the system in the virtual environment), a location in the virtual environment determined based on user preferences (e.g., a user specifying default coordinates and/or a desire to be proximal to an attribute in the virtual environment such as, for example, a virtual entrance/door of the virtual environment, the middle of the virtual environment, the corner of the virtual environment, etc., and/or based on virtual coordinates generated by the recommendation system). Following the user input and/or the default location, the second virtual indicator 128(2) may move and/or be located at the particular location in the virtual environment and the particular location may have virtual coordinates that are within the first virtual proximity radius 130(1) of the first virtual indicator 128(1). In some examples, virtual environment component 120 may connect the first communication session and the second communication session. Additionally, or alternatively, virtual environment component 120 may cause the second communication session to join the first communication session as a result of the second virtual indicator 128(2) being within the first virtual proximity radius 130(1) of the first virtual indicator 130(1). In some examples, a first connection is established including the first communication session and the second communication session. Additionally, or alternatively, the virtual environment component 120 may determine that the first virtual indicator 128(1) is within the second virtual proximity 130(2) radius of the second virtual indicator 128(2) and may cause the first communication session to join the second communication session as a result of the first virtual indicator 128(1) being within the second virtual proximity radius 130(2) of the second virtual indicator 130(2). In some examples, a second connection is established including the second communication session and the first communication session.

The communication system 102 may utilize the communication session component 122 to communicate conversation data between participants 106 included in the virtual environment. For example, the communication session component 122 may utilize the personal communication bridge (s) to communicate conversation data between user device A 110(1) associated with the first user account and user device B 110(2) associated with the second user account. In some examples, the communication session component 122 may cause participants 106 to send conversation data to each communication session (or personal conference room/bridge) included in a connection and/or conversation (i.e., within a threshold proximity). Additionally, or alternatively, the communication session component 122 may cause the participants 106 to receive conversation data through only the communication session associated with the participants user account (e.g., the participants personal conference room/bridge).

In some examples, the communication session component 122 may cause the first user account may send conversation data to all of the personal communication bridges included in the first connection and may receive all conversation data via the first communication bridge. Additionally, or alternatively, the communication session component 122 may cause the second user account may send all conversation data to all of the communication bridges included in the second connection and may receive all conversation data via the second communication bridge. For example, when the participant 106(1) associated with the first user account inputs conversation data such as, for example, speech, text, video, files, and/or any type of media capable of being communicated via a data representation, the communication session component 122 may cause the first user account may send the conversation data to all of the communication sessions included in the first connection, such as, for example, the first personal communication bridge and/or the second personal communication bridge. The communication session component 122 may be configured such that each participant associated with a utilized connection, such as the first connection, receives conversation data via the personal conference bridge associated with the user account. For example, the second user account may receive the conversation data from the first user account via the second communication bridge.

Additionally, or alternatively, the communication session component 122 may determine the sender of the conversation data and may not send the communication data to the personal conference bridge associated with the user account determined to be the sender. For example, the first user account may be determined to be the sender, and the communication system may determine to not send the conversation data from the first user account to the first user account via the first communication session, such that the first user account does not receive an echo of the conversation data they just sent.

The communication system 102 may utilize the recommendation component 124 to generate and/or provide recommendations to user accounts participating in a virtual group communication environment 100. For example, the recommendation component 124 may generate a recommendation to move to a virtual indicator 128 a particular location represented by virtual coordinates in the virtual environment. In some examples, a participant 106(1) associated with the first user account may provide input, to user device A 110(1) associated with the first user account, representing a request to receive a recommended move to join a new conversation and/or connection. User device A 110(1) may send the request to the communication system 102 and the recommendation component 124 may generate a recommendation to move the first virtual indicator 128(1). In some examples, the recommendation may be a recommended move to a new location that that ensures that the first virtual indicator 128(1) is within a third virtual proximity radius 130 of a third virtual indicator 128 and/or will result in the first user account joining a new conversation that may be of interest to the participant associated with the first user account. For example, the recommended location associated with the new conversation may be based on various data and/or various determinations made by the recommendation component 124. In some examples, the recommendation may be based at least partly on a similarity between the content of conversations associated with participants, metadata associated with a participant's user profile, and/or one or more environmental measurements.

As mentioned above, the recommendation component 124 may generate a recommendation based on a similarity between the content of conversations associated with participants 106. For example, the recommendation component 124 may generate a similarity score between first content transcribed from first conversation data exchanged via a first communication session associated with a first user profile and second content transcribed from second conversation data exchanged via a second communication session associated with a second user profile. In some examples, recommendation component 124 may utilize the conversation data, such as, for example, a document including a transcript of recent conversation(s) associated with a user account, a document including a full historical transcript associated with a user account (e.g., a transcript including up to the complete conversation history associated with a user profile), and/or a measure of speech exchange (e.g., a measure of how frequent a participant is talking in group conversations), to generate and/or determine various data for generating a similarity score. In some examples, the recommendation component 124 may compute the similarity between two documents using various approaches, such as, for example, a Kolmogorov-based similarity (normalized compression distance, normalized information distance, etc.), a classic NLP-based sentence similarity (Doc2Vec, Sent2Vec, Word Mover's Distance (WMD), etc.), and/or an advanced NLP-based sentence similarity (Bidirectional Encoder Representations from Transformers (BERT), Sentence Bidirectional Encoder Representations from Transformers (S-BERT), Universal Sentence Encoder (USE), etc.). Additionally, or alternatively, the recommendation component 124 may compute the similarity between the measure of speech exchange associated with two user profiles, such as, for example, a measure of how much a participant is contributing in conversation data. For example, the recommendation component 124 may generate a recommendation based on two user profiles having a similar measure of speech exchange, such that, the two user profiles contributed to previous conversations at a substantially similar rate.

Additionally, or alternatively, the recommendation component 124 may generate a recommendation based at least partly on metadata associated with user profiles. For example, a user profile may include metadata indicating personal interests and/or preferences associated with a participant. Additionally, or alternatively, the recommendation component 124 may generate derived data indicating additional interests associated with a user account by leveraging the metadata and/or transcribed conversation data associated with a user account. In some examples, the recommendation component 124 may generate the derived data utilizing various conversational artificial intelligence (AI) platforms, such as, for example, MindMeld. The recommendation component 124 may then utilize the metadata associated with the user profile and/or the derived data associated with the user profile to generate the recommendations. Additionally, or alternatively the recommendation component 124 may utilize the metadata and/or the derived data in combination with the transcribed conversation data to compute the similarity score.

Additionally, or alternatively, the recommendation component 124 may generate a recommendation based at least partly on one or more environmental measurements. For example, the recommendation component 124 may determine a level of connectivity and/or a connection strength associated with a personal communication bridge and/or a user profile. In some examples, the recommendation component 124 may determine if a level of connectivity and/or connection strength associated with a personal communication bridge and/or a user profile meets and/or exceeds a threshold level of connectivity and/or connection strength, such as to ensure the quality of a conversation between personal communication bridge(s) and the quality of experience (QoE). In some examples, the recommendation component 124 may then utilize the environmental measurement(s), such as, for example, the level of connectivity and/or connection strength associated with a communication bridge and/or a user profile, the metadata and/or derived data, and/or the transcribed conversation data in any combination to compute the similarity score.

Figure 2A:
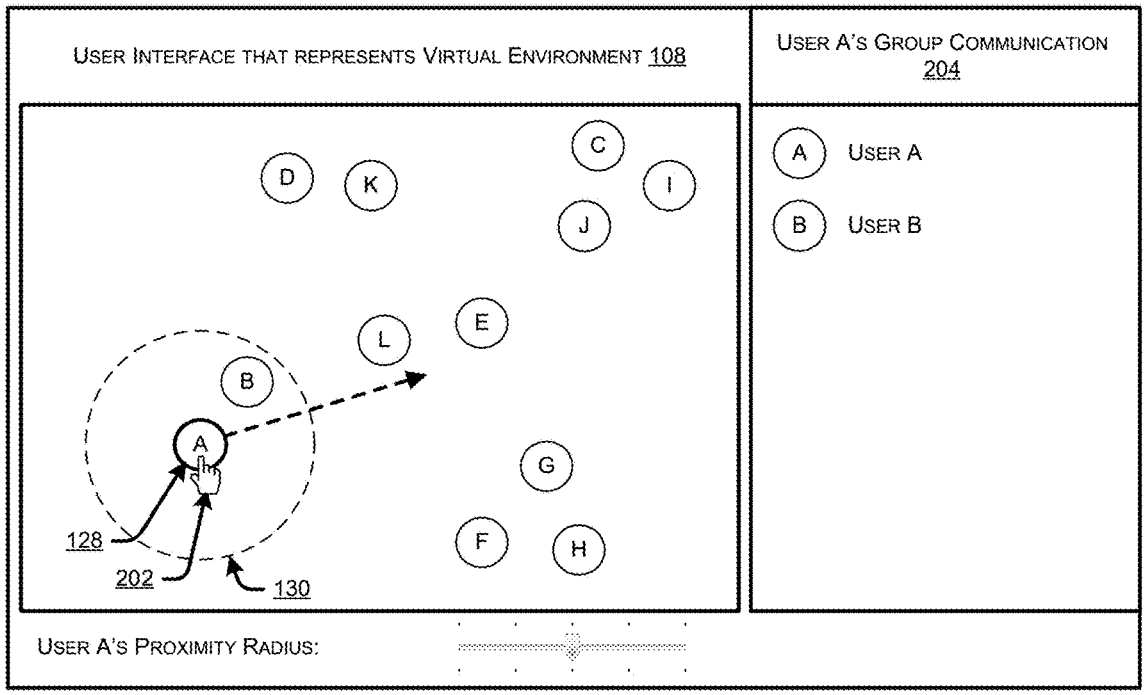
FIG. 2A illustrates an example diagram of user interface that represents a virtual environment and is configured to receive user input to move to a new location in the virtual environment.

FIG. 2A illustrates an example diagram 200 of a virtual environment 108 configured to receive user input 202 to move to a new location in the virtual environment.

In some examples, a user device 110 may be configured to receive user input from a user 106 representing a move from a first location in a virtual environment to a second location in the virtual environment. In some examples, the user input 202 may be received via a mouse, a selection on a touch screen, and/or any other peripheral device configured for sending user input to a user device 110. In some examples, the user input 202 may represent a move by selecting the virtual indicator 128 and dragging and dropping the virtual indicator 128 to a new location in the virtual environment. In some examples, the resulting representation of the virtual environment 108 from the received user input 202 illustrated in FIG. 2A may be represented in FIG. 2B.

As shown in FIG. 2A, the virtual indicator of user A 128 has a virtual proximity radius 130, and the virtual indicator of user B is within the virtual proximity radius 130 of the virtual indicator of user A 128. As such, user A's group communication bridge 204 includes user A and user B, such that, user A may send conversation data to all of the personal communication bridges associated with user A's group communication. In some examples, user B may receive the conversation data via user B's personal communication bridge. Additionally, or alternatively, the communication system 102 may identify user A as the sender of the conversation data and/or may determine that user A should not receive the conversation data via user A's personal communication bridge, as user A has been identified as the sender.

User B may have a virtual proximity radius of the virtual indicator of user B. In some examples, the virtual indicator of user A 128 may be within the virtual proximity radius of the virtual indicator of user B. As such user B may have a group communication bridge that includes user B and user A, such that user B may send conversation data to all of the personal communication bridges associated with user B's group communication. For example, user B may send conversation data to all of the personal communication bridges associated with user B's group communication bridge, and user A may receive the conversation data via user A's personal communication bridge. Additionally, or alternatively, user B may be identified as the sender, as mentioned above, and may not receive the conversation data.

Figure 2B:
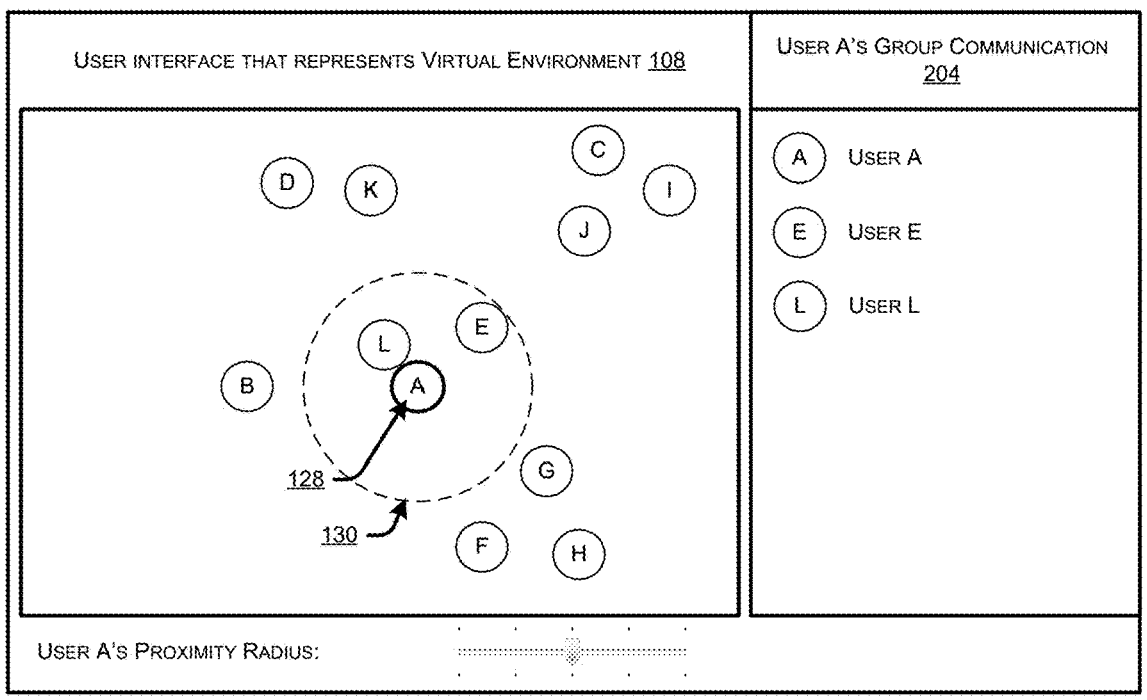
FIG. 2B illustrates an example diagram of a user interface that represents a virtual environment following user input to move to a new location in the virtual environment.

FIG. 2B illustrates an example diagram 210 of a virtual environment 108 following the user input to move to a new location in the virtual environment.

As shown in FIG. 2B, the virtual indicator of user A 128 has a virtual proximity radius 130, and the virtual indicator of user's L and E are within the virtual proximity radius 130 of the virtual indicator of user A 128. As such, user A's group communication 204 includes user A, user E, and user L, such that, user A may send conversation data to all of the personal communication bridges associated with user A's group communication 204. Additionally, or alternatively, the virtual indicator of user B is no longer within the virtual proximity radius 130 of the virtual indicator of user A 128. As such, user A's group communication 204 no longer includes user B. In some examples, user E may receive the conversation data via user E's personal communication bridge. Additionally, or alternatively, user L may receive the conversation data via user L's personal communication bridge. Additionally, or alternatively, the communication system 102 may identify user A as the sender of the conversation data and/or may determine that user A should not receive the conversation data via user A's personal communication bridge, as user A has been identified as the sender.

User's E and/or L may have a virtual proximity radius of the associated virtual indicator. In some examples, the virtual indicator of user A 128 may be within the virtual proximity radius of the virtual indicator of user E and/or the virtual proximity radius of the virtual indicator of user L. In this example, user E may have a group communication that includes user E, user A, and/or user L. Additionally, or alternatively, user L may have a group communication that includes user L, user A, and/or user E. In such an example, the communication system 102 may be configured to cause: user A to send all conversation data via user A's group communication 204, including user A, user E, and user L; user E to send all conversation data via user E's group communication, including user E, user A, and user L; and user L to send all conversation data via user L's group communication, including user L, user A, and user E; such that the conversation data is sent to a private communication bridge associated with each user included in the sender's group communication. Additionally, or alternatively, the communication system may be configured to cause user A to receive all conversation data via user A's private communication bridge, user E to receive all conversation data via user E's private communication bridge, and/or user L to receive all conversation data via user L's private communication bridge.

Figure 3A:
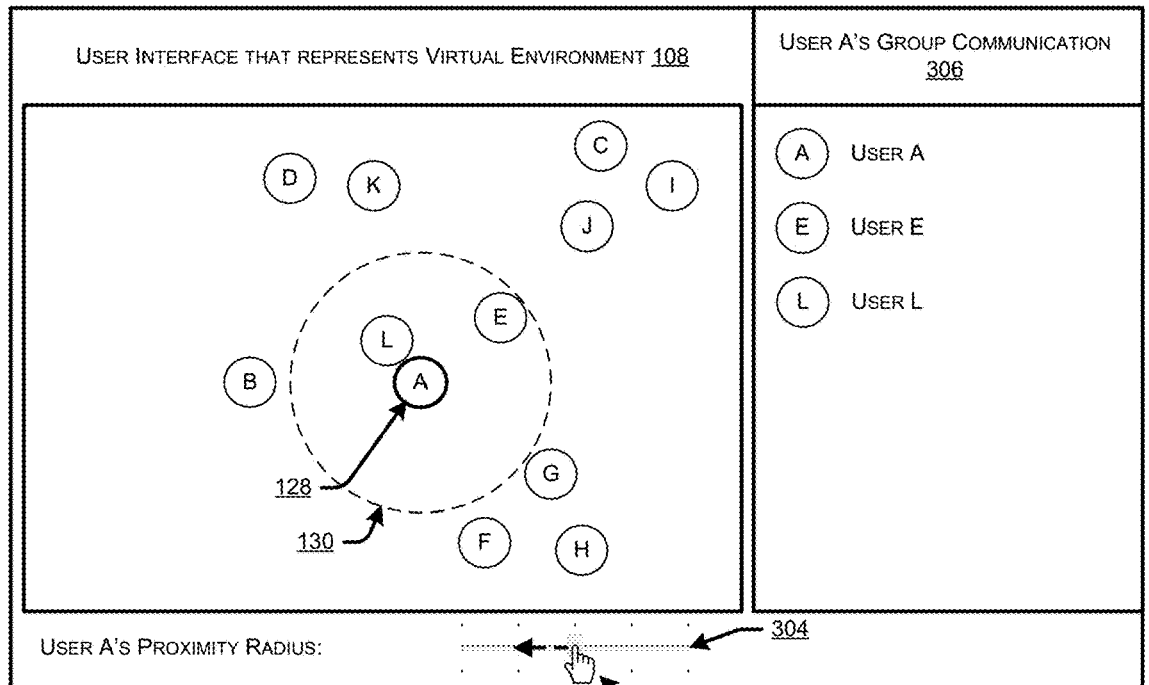
FIG. 3A illustrates an example diagram of a user interface that represents a virtual environment and is configured to receive user input to adjust the virtual proximity radius of the user in the virtual environment.

FIG. 3A illustrates an example diagram 300 of a virtual environment 108 configured to receive user input 302 to adjust the virtual proximity radius 130 of the virtual indicator 128 in the virtual environment.

In some examples, a user device 110 may be configured to receive user input 302 from a user 106 representing an adjustment of a virtual proximity radius 130. In some examples, the user input 302 may be received via a mouse, a selection on a touch screen, and/or any other peripheral device configured for sending user input to a user device 110. In some examples, the user input 302 may represent an adjustment of a virtual proximity radius 130 by providing input to the virtual proximity radius slider 304, such as, for example, a click, a click-and-drag, or any other type of input defining a value for a virtual proximity radius 130. In this example, the user input 302 is manipulating the virtual proximity radius slider 304 to decrease the virtual proximity radius 130. In some examples, the resulting representation of the virtual environment 108 from the received user input 302 illustrated in FIG. 3A may be represented in FIG. 3B.

As shown in FIG. 3A, the virtual indicator of user A 128 has a virtual proximity radius 130, and the virtual indicators of user L and user E are within the virtual proximity radius 130 of the virtual indicator of user A 128. As such, user A's group communication 306 includes user A, user E, and user L, such that, user A may send conversation data to all of the personal communication bridges associated with user A's group communication 306. In some examples, user E may receive the conversation data via user E's personal communication bridge. Additionally, or alternatively, user L may receive the conversation data via user L's personal communication bridge. Additionally, or alternatively, the communication system 102 may identify user A as the sender of the conversation data and/or may determine that user A should not receive the conversation data via user A's personal communication bridge, as user A has been identified as the sender.

As previously described above with respect to FIG. 2B, User's E and/or L may have a virtual proximity radius of the associated virtual indicator. In some examples, the virtual indicator of user A 128 may be within the virtual proximity radius of the virtual indicator of user E and/or the virtual proximity radius of the virtual indicator of user L. In this example, user E may have a group communication that includes user E, user A, and/or user L. Additionally, or alternatively, user L may have a group communication that includes user L, user A, and/or user E. In such an example, the communication system 102 may be configured to cause: user A to send all conversation data via user A's group communication 306, including user A, user E, and user L; user E to send all conversation data via user E's group communication, including user E, user A, and user L; and user L to send all conversation data via user L's group communication, including user L, user A, and user E; such that the conversation data is sent to a private communication bridge associated with each user included in the sender's group communication. Additionally, or alternatively, the communication system may be configured to cause user A to receive all conversation data via user A's private communication bridge, user E to receive all conversation data via user E's private communication bridge, and/or user L to receive all conversation data via user L's private communication bridge.

Figure 3B:
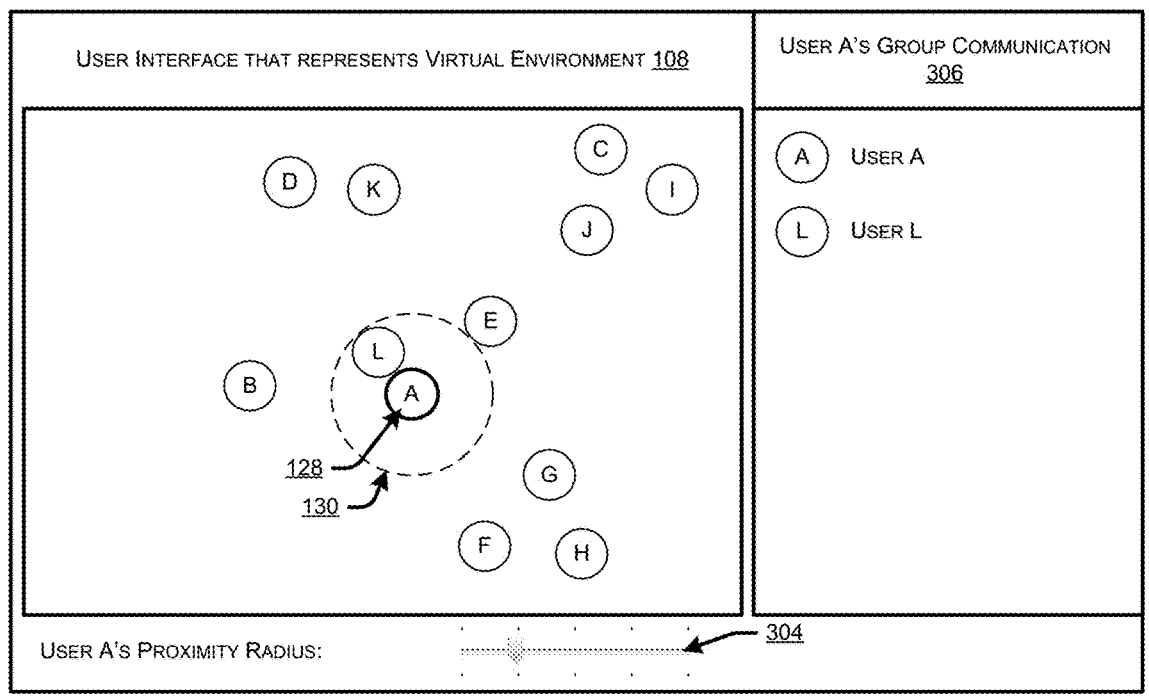
FIG. 3B illustrates an example diagram of a user interface that represents a virtual environment following user input to adjust the virtual proximity radius of the user in the virtual environment.

FIG. 3B illustrates an example diagram 310 of a virtual environment 108 following the user input to adjust the virtual proximity radius 130 of the virtual indicator 128 in the virtual environment.

As shown in FIG. 3B, the virtual indicator of user A 128 has a new, smaller, virtual proximity radius 130 following the user input 302 to reduce the virtual proximity radius 130. As such, the virtual indicator of user L is within the virtual proximity radius 130 of the virtual indicator of user A 128. As such, user A's group communication 306 includes user A and user L, such that, user A may send conversation data to all of the personal communication bridges associated with user A's group communication. Additionally, or alternatively, the virtual indicator of user E is no longer within the virtual proximity radius 130 of the virtual indicator of user A 128. As such, user A's group communication 306 no longer includes user E. In some examples, user L may receive the conversation data via user L's personal communication bridge. Additionally, or alternatively, the communication system 102 may identify user A as the sender of the conversation data and/or may determine that user A should not receive the conversation data via user A's personal communication bridge, as user A has been identified as the sender.

User L may have a virtual proximity radius of the virtual indicator of user L. In some examples, the virtual indicator of user A 128 may be within the virtual proximity radius of the virtual indicator of user L. As such user L may have a group communication that includes user L and user A, such that user L may send conversation data to all of the personal communication bridges associated with user L's group communication. For example, user L may send conversation data to all of the personal communication bridges associated with user L's group communication, and user A may receive the conversation data via user A's personal communication bridge. Additionally, or alternatively, user L may be identified as the sender, as mentioned above, and may not receive the conversation data.

Figure 4A:
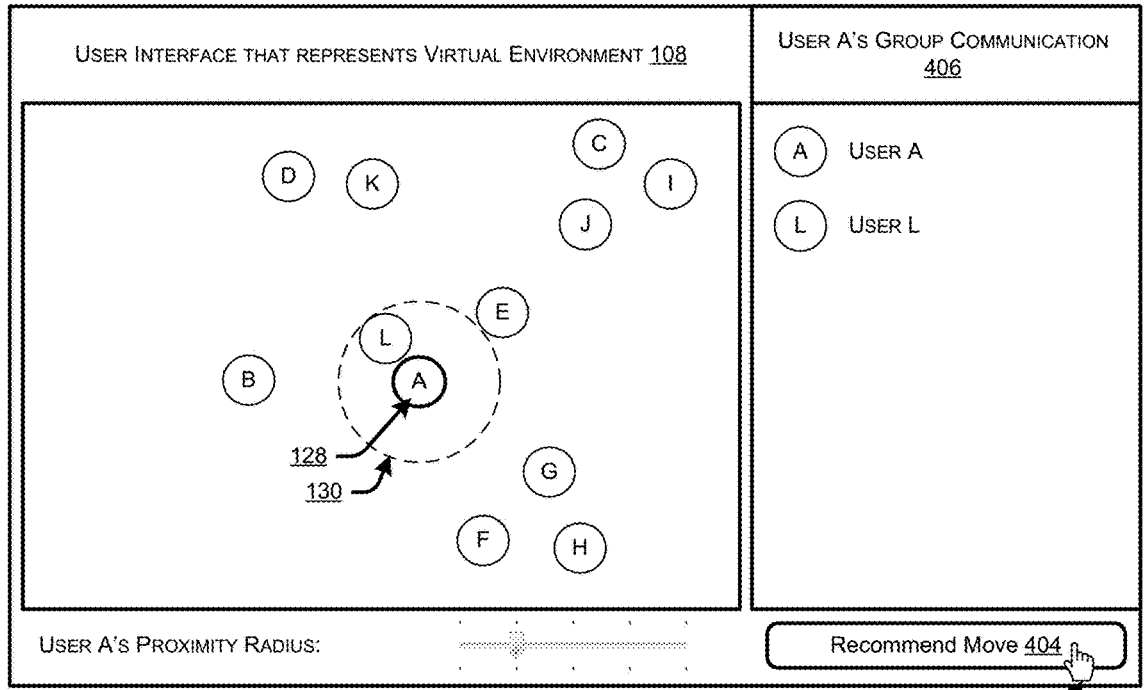
FIG. 4A illustrates an example diagram of a user interface that represents a virtual environment and is configured to receive user input representing a request to receive a recommendation to move to a new location in the virtual environment.

FIG. 4A illustrates an example diagram 400 of a virtual environment 108 configured to receive user input 402 representing a request to receive a recommendation to move to a new location in the virtual environment.

In some examples, a user device 110 may be configured to receive user input 402 from a user 106 representing a request to receive a recommendation to move to a new location in the virtual environment. In some examples, the user input 402 may be received via a mouse, a selection on a touch screen, and/or any other peripheral device configured for sending user input to a user device 110. In some examples, the user input 402 may be received via providing the input 402 to the recommend move button 404. In some examples, the resulting representation of the virtual environment 108 from the received user input 402 illustrated in FIG. 4A may be represented in FIG. 4B.

As shown in FIG. 4A, the virtual indicator of user L is within the virtual proximity radius 130 of the virtual indicator of user A 128. As such, user A's group communication 406 includes user A and user L, such that, user A may send conversation data to all of the personal communication bridges associated with user A's group communication. Additionally, or alternatively, the virtual indicator of user E is no longer within the virtual proximity radius 130 of the virtual indicator of user A 128. As such, user A's group communication 306 no longer includes user E. In some examples, user L may receive the conversation data via user L's personal communication bridge. Additionally, or alternatively, the communication system 102 may identify user A as the sender of the conversation data and/or may determine that user A should not receive the conversation data via user A's personal communication bridge, as user A has been identified as the sender.

User L may have a virtual proximity radius of the virtual indicator of user L. In some examples, the virtual indicator of user A 128 may be within the virtual proximity radius of the virtual indicator of user L. As such user L may have a group communication that includes user L and user A, such that user L may send conversation data to all of the personal communication bridges associated with user L's group communication. For example, user L may send conversation data to all of the personal communication bridges associated with user L's group communication, and user A may receive the conversation data via user A's personal communication bridge. Additionally, or alternatively, user L may be identified as the sender, as mentioned above, and may not receive the conversation data.

Figure 4B:
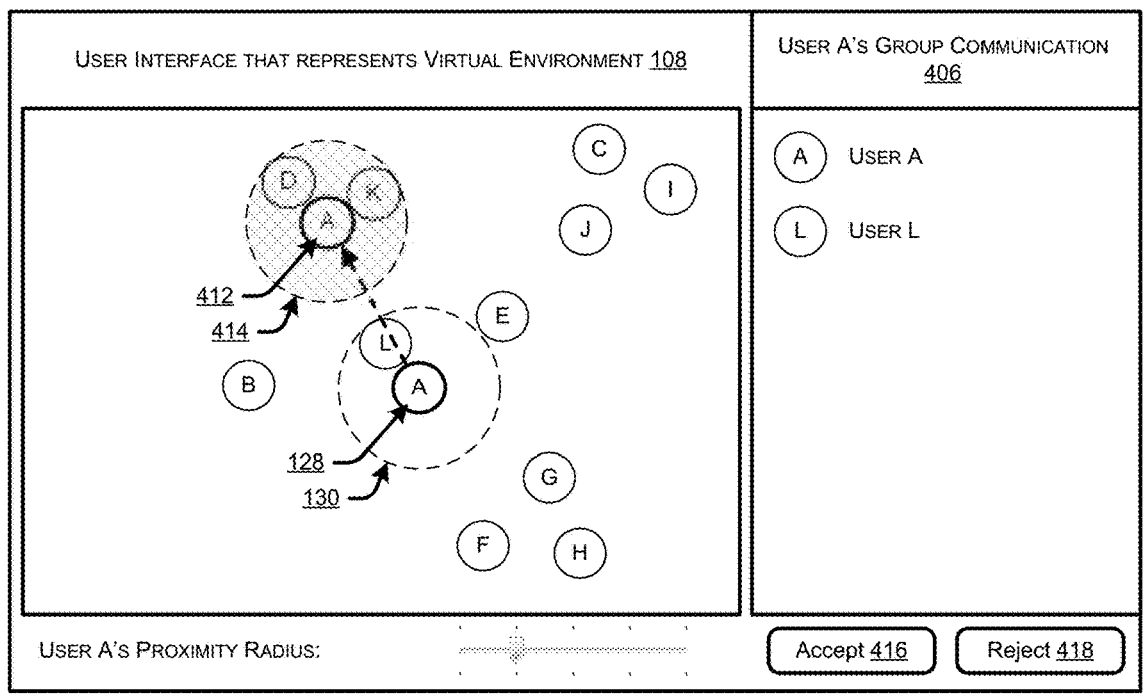
FIG. 4B illustrates an example diagram of a user interface that represents a virtual environment for presenting a recommendation to move to a new location in the virtual environment.

FIG. 4B illustrates an example diagram 410 of a virtual environment 108 for presenting a recommendation to move to a new location in the virtual environment.

As shown in FIG. 4B, a recommended move is presented on the representation of the virtual environment 108. In some examples, the recommended move may include a potential virtual indicator of user A 412 and/or a potential virtual proximity radius 414 of the potential virtual indicator of user A 412. In some examples, a user may provide additional user input to accept 416 and/or reject 418 the recommended move. Should the user accept 416 the recommended move, then the virtual indicator of user A 128 and/or the virtual proximity radius 130 of the virtual indicator of user A 128 may be move to the new location represented by the potential virtual proximity indicator of user A 412 and/or the potential virtual proximity radius 414 of the potential virtual indicator of user A 412. Additionally, or alternatively, should the user reject 418 the recommended move, then the virtual indicator of user A 128 and/or the virtual proximity radius 130 of the virtual indicator of user A 128 may remain in the same virtual location. Additionally, or alternatively, the user may reject 418 the recommended move and be presented the recommend move button 404 to receive a new recommended move and/or the previous recommended move.

The recommendation component 124 may generate the recommended move based at least partly on various determinations, such as, for example, a similarity between the content of conversations associated with participants, metadata associated with a participant's user profile, context associated with a participant's user profile, and/or one or more environmental measurements. In some examples, the recommendation component 124 may transcribe the conversation data being sent by user's A-K into respective documents including the transcripts of the conversation data (e.g., document A including transcripts of conversation data associated with user A, document B including transcripts of conversation data associated with user B, etc.). These documents including transcripts may be configured as any of the documents including transcripts described above, such as, for example, a document including a transcript of recent conversation(s) associated with a user account, a document including a full historical transcript associated with a user account (e.g., a transcript including up to the complete conversation history associated with a user profile), and/or a measure of speech exchange (e.g., a measure of how frequent a participant is talking in group conversations).

In some examples, the recommendation component 124 may generate a similarity score between the content of document A with respect to all of the other documents B-L. In this example, the recommendation component 124 may determine that user D and/or user K have the highest similarity score with respect to user A. Additionally, or alternatively, the recommendation component 124 may generate the recommended move based at least partly on metadata associated with a user profile, such as, for example, metadata indicating personal interests and/or preferences associated with a user account. Additionally, or alternatively, the recommendation component 124 may generate the recommended move based at least partly on derived data including additional interests associated with the user account, generated overtime using one or more conversational AI platforms, such as, for example, MindMeld. Additionally, or alternatively, the recommendation component 124 may utilize the metadata and/or derived metadata in combination with the similarity score to generate the recommended move. As such, the recommendation component 124 may generate the recommended move to a location, such that, the virtual indicator of user A 128 may be within the virtual proximity radius of the virtual indicator of user D and/or user K.

Figure 5:
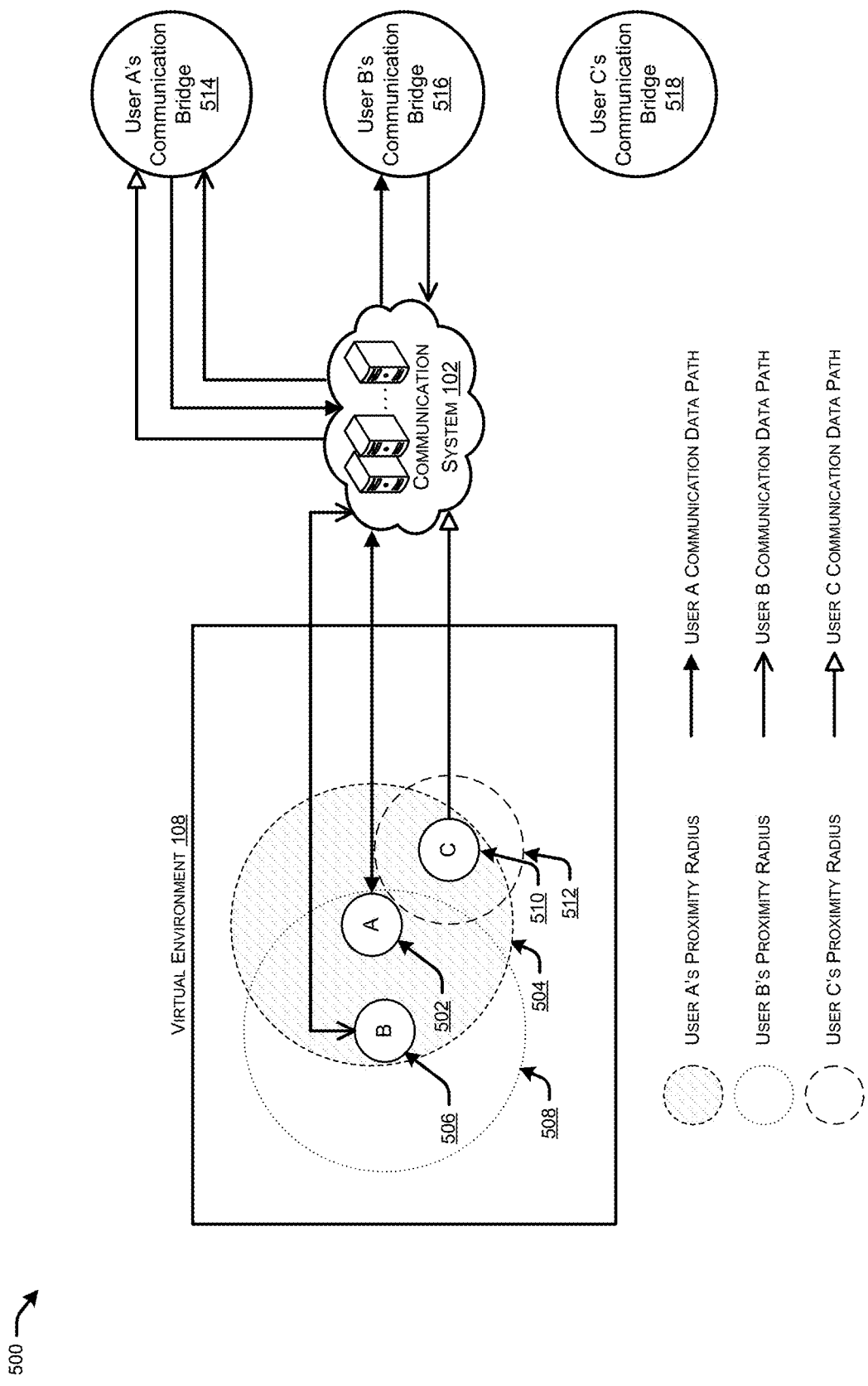
FIG. 5 illustrates an example diagram of a user interface that represents a virtual environment and the communication data paths of the virtual indicators associated with the participants included in the virtual environment.

FIG. 5 illustrates an example diagram 500 of a virtual environment 108 and the communication data paths of the virtual indicators associated with the participants included in the virtual environment 108.

As shown in FIG. 5, a virtual environment 108 may include one or more virtual indicators and/or one or more virtual proximity radii of the virtual indicators, such as, for example, a virtual indicator of user A 502, and a virtual proximity radius of the virtual indicator of user A 504, a virtual indicator of user B 506, and a virtual proximity radius of the virtual indicator of user B 508, and/or a virtual indicator of user C 510, and a virtual proximity radius of the virtual indicator of user C 512. In some examples, User A may have established user A's communication bridge 514 with the communication system 102, such that user A may receive communication data via user A's communication bridge 514. Additionally, or alternatively, user B may have established user B's communication bridge 516 with the communication system 102, such that user B may receive communication data via user B's communication bridge 516. Additionally, or alternatively, user C may have established user C's communication bridge 518 with the communication system 102, such that user C may receive communication data via user C's communication bridge 518.

In some examples, the one or more virtual indicators may be within the one or more virtual proximity radii of the one of more virtual indicators. Take for example, the virtual indicator of user A 502 having the virtual indicator of user B 506 and the virtual indicator of user C 510 within the virtual proximity radius of user A 504. As such, user A may have a group communication including user B and user C, such that, when user B and/or user C send communication data, the communication data is routed to user A via user A's communication bridge 514. Additionally, or alternatively, the virtual indicator of user B 506 may have the virtual indicator of user A 502 within the virtual proximity radius of user B 508. As such, user B may have a group communication including user A, such that, when user A sends communication data, the communication data is routed to user B via user B's personal communication bridge 516. Additionally, or alternatively, user B's group communication may not include user C, such that, when user C sends communication data, the communication data is not routed to user B. Additionally, or alternatively, the virtual indicator of user C 510 may not have any virtual indicators of users within the virtual proximity radius of user C 512. As such, user C may not have a group communication, and as such, user C may not receive any communication data via user C's personal communication bridge 518.

FIGS. 6 and 7 illustrate flow diagrams of example methods 600 and 700 and that illustrate aspects of the functions performed at least partly by the communication system 102 as described in FIG. 1. The logical operations described herein with respect to FIGS. 6 and 7 may be implemented (1) as a sequence of computer-implemented acts or program modules running on a computing system and/or (2) as interconnected machine logic circuits or circuit modules within the computing system. In some examples, the method(s) 600 and 700 may be performed by a system comprising one or more processors and one or more non-transitory computer-readable media storing computer-executable instructions that, when executed by the one or more processors, cause the one or more processors to perform the method(s) 600 and/or 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6 and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for a network-based communication system 102 to provide a participant 106 with access to user interface that represents a virtual environment 108 and a virtual indicator 128 having a virtual proximity radius 130 and establish connection(s) between a personal communication bridge associated with the participant 106 and additional personal communication bridge(s) associated with additional participants 106 within the virtual proximity radius 130 of the virtual indicator 128.

At 602, a communication system 102 may receive, at the network-based communication system 102 and from a first user device 110(1) associated with a first user account, a request access a virtual environment.

At 604, the communication system 102 may provide the first user account with access to a user interface that represents the virtual environment 108(1). In some examples, the user interface that represents the virtual environment 108 may be specific to the first user account.

At 606, the communication system 102 may provide a first virtual indicator 128(1) via the user interface, associated with the first user account, at a first virtual location in the virtual environment. In some examples, the virtual environment may include a plurality of virtual indicators associated with additional user accounts.

At 608, the communication system 102 may determine that a second virtual indicator 128(2) associated with a second user account is within a first virtual proximity radius 130(1) of the first virtual indicator 128(1). In some examples, the communication system 102 may utilize any of the techniques described above with respect to FIGS. 1-5 to determine if a virtual indicator 128 is within a virtual proximity radius 130 of another virtual indicator 128.

At 610, the communication system 102 may connect a first personal communication bridge of the first user device with a second personal communication bridge of a second user device associated with the second user account. In some examples, the communication system 102 may connect the first personal communication bridge with the second personal communication bridge based at least in part on the second virtual indicator 128(2) being within the first virtual proximity radius 130(1). In some examples, communication data can be communicated between the first user device 110(1) and the second user device 110(2) via the first personal communication bridge and the second personal communication bridge. Additionally, or alternatively, the communication system 102 may communicate the communication data using any of the methods described above with respect to FIGS. 1-5.

Additionally, or alternatively, the method 600 may include providing, to the first user account and from the network-based communication system 102, a recommendation to move the first virtual indicator 128(1) to a second virtual location in the virtual environment. In some examples, at least a third virtual indicator 128 associated with a third user account is within the first virtual proximity radius 130(1) from the second virtual location. Additionally, or alternatively, the method 600 may include receiving, at the network-based communication system 102 and from the first user device 110(1), an acceptance of the recommendation. Additionally, or alternatively, the method 600 may include determining, based at least in part on the first virtual indicator 128(1) moving to the second location, that the second virtual indicator 128(2) is outside the first virtual proximity radius 130(1) of the first virtual indicator 128(1). Additionally, or alternatively, the method 600 may include disbanding a connection between the second personal communication bridge and the first personal communication bridge based at least in part on the second virtual indicator 128(2) being outside the first virtual proximity radius 130(1) of the first virtual indicator 128(1). Additionally, or alternatively, the method 600 may include determining that the third virtual indicator 128 associated with the third user account is within the first virtual proximity radius 130(1) of the first virtual indicator 128(1). Additionally, or alternatively, the method 600 may include connecting the first personal communication bridge to a third personal communication bridge of a third user device associated with the third user based at least in part on the third virtual indicator 128 being within the first virtual proximity radius 130(1). In some examples, data can be communicated between the first user device 110(1) and the third user device 110 via the first personal communication bridge and the third personal communication bridge.

Additionally, or alternatively, the method 600 may include generating first context associated with the first user account. In some examples, the first context based at least in part on a first content associated with the first user account. Additionally, or alternatively, the method 600 may include generating second context associated with the third user account. In some examples, the third context may be based at least in part on a second content associated with the third user account. In some examples, the first content and/or the second content may include at least one of a conversation history associated with the participant's user account, a spoken language associated with the participant's user account, an accent associated with the participant's user account, a gender associated with the participant's user account, a speech style associated with the participant's user account, a connection quality associated with the participant's user account, and/or social media data associated with the participant's user account. Additionally, or alternatively, the method 600 may include determining a level of similarity between first context included in the first transcript and second context included in the second transcript. Additionally, or alternatively, the method 600 may include determining that the level of similarity satisfies a threshold level of similarity. Additionally, or alternatively, the method 600 may include generating the recommendation based at least in part on the level of similarity satisfying the threshold level of similarity.

Additionally, or alternatively, in some examples, the first conversation history and/or the second conversation history may be a short-lived conversation history including a most recent conversation associated with the first user account or the third user account and/or a long-lived conversation history including multiple conversations associated with the first user account or the third user account. In particular, short-lived recommendation (SLR) is a single-step recommendation based on the most recent transcript excerpts and the participant new preferences and user profile updated over time. Long-lived recommendation (LLR) is an evolutionary multi-steps recommendation based on the full historical conversation transcripts and permanent participant profiles. Long-lived recommendations may follow an evolution model in which the evolution of peer groups formation in the virtual space is driven by the short-lived recommendation algorithm. Actually, LLRs can be composable by simple aggregation of SLRs and adjustment of the recommendation list to enhance performance without exceeding resource consumptions and resource quotas, but other LLRs composition algorithms from SLRs are possible.

Additionally, or alternatively, the method 600 may include analyzing a conversation represented by the communication data associated with the first personal communication bridge and/or the second personal communication bridge. Additionally, or alternatively, the method 600 may include determining, based at least in part on analyzing the conversation, a topic of the conversation. Additionally, or alternatively, the method 600 may include identifying a third user account having preferences that correspond to the topic of the conversation. Additionally, or alternatively, the method 600 may include providing, to the third user account and from the network-based communication system, a recommendation to join the conversation based at least in part on the third user account having preferences that correspond to the topic of the conversation.

Additionally, or alternatively, the method 600 may include receiving, at the network-based communication system and from the first user device, user input representing a command to increase the first virtual proximity radius of the first virtual indicator to a second virtual proximity radius of the first virtual indicator. Additionally, or alternatively, the method 600 may include determining that a third virtual indicator associated with a third user account is within the second virtual proximity radius of the first virtual indicator.

Additionally, or alternatively, the method 600 may include connecting the first personal bridge to a third personal bridge of a third user device associated with the third user account based at least in part on the third virtual indicator being within the second virtual proximity radius. In some examples, data may be communicated between the first user device and a third user device associated with the third user account via the first personal communication bridge and/or the third personal communication bridge.

Additionally, or alternatively, the method 600 may include receiving, at the network-based communication system and from the first user device, user input representing a command to decrease the first virtual proximity radius of the first virtual indicator to a second virtual proximity radius of the first virtual indicator. Additionally, or alternatively, the method 600 may include determining that the second virtual indicator is outside the second virtual proximity radius of the first virtual indicator. Additionally, or alternatively, the method 600 may include disbanding a connection between the second personal communication bridge and the first personal communication bridge based at least in part on the second virtual indicator being outside the second virtual proximity radius of the first virtual indicator.

FIG. 7 illustrates a flow diagram of an example method 700 for a user device 110 to send a request to a network-based communication system to access a virtual environment, receive access to a user interface that represents the virtual environment and a virtual indicator having a virtual proximity radius, and determine that a first connection has been established between first personal communication bridge of a user device associated with the participant and additional personal communication bridges of additional user devices associated with the additional participants that are within the virtual proximity radius of the participant's virtual indicator.

At 702, the method 700 may include sending, from a first user device 110(1) associated with a first user account and to a network-based communication system 102, a request to access a virtual environment.

At 704, the method 700 may include receiving, at the first user device 110(1) and from the network-based communication system 102, access to a user interface that represents the virtual environment 108(1). In some examples, the user interface representation of the virtual environment may include a plurality of virtual indicators associated with additional user accounts.

At 706, the method 700 may include receiving, via the user interface, a first virtual indicator 128(1), associated with the first user account, at a first virtual location in the virtual environment. In some examples, the first virtual indicator 128(1) may a have first virtual proximity radius 130(1).

At 708, the method 700 may include determining that a first connection between a first personal communication bridge of the first user device and a second personal communication bridge of a second user device associated with a second user account has been established. In some examples, the second user account may be associated with a second virtual indicator 128(2) that is within the first virtual proximity radius 130(1) of the first virtual indicator 128(1). In some examples, the communication system 102 may utilize any of the techniques described above with respect to FIGS. 1-5 to determine if a virtual indicator 128 is within a virtual proximity radius 130 of another virtual indicator 128. Additionally, or alternatively, the communication system 102 may establish the first connection using any of the methods described above with respect to FIGS. 1-5. Additionally, or alternatively, communication data may be communicated between the first user device 110(1) and the second user device 110(2) via the first personal communication bridge and the second personal communication bridge. Additionally, or alternatively, the communication system 102 may communicate the communication data using any of the methods described above with respect to FIGS. 1-5.

Additionally, or alternatively, the method 700 may include receiving, at the first user device and from the network-based communication system, a recommendation to move the first virtual indicator to a second virtual location in the virtual environment. In some examples, at least a third virtual indicator associated with a third user account may be within the first virtual proximity radius from the second virtual location. Additionally, or alternatively, the method 700 may include receiving input at the first user device. In some examples, the input may represent an acceptance of the recommendation. Additionally, or alternatively, the method 700 may include determining that the first connection between the second personal communication bridge and the first personal communication bridge has been disbanded based at least in part on the second virtual indicator being outside of the first virtual proximity of the first virtual indicator. Additionally, or alternatively, the method 700 may include determining that a second connection between the first personal communication bridge and a third personal communication bridge of a third user device associated with a third user account has been established. In some examples, the third user account may be associated with the third virtual indicator that is within the first virtual proximity radius of the first virtual indicator. In some examples, communication data may be communicated between the first user device and the third user device via the first personal communication bridge and/or the third personal communication bridge.

Additionally, or alternatively, in some examples, the recommendation is based at least in part on similarity data representing a level of similarity associated with the first user account and the third user account. In some examples, the similarity data based at least in part on at least one of a first conversation history associated with the first user account, a second conversation history associated with the third user account, a first connection level associated with the first personal communication bridge, a second connection level associated with the third personal communication bridge, first preferences associated with the first user account, and/or second preferences associated with the second user account.

Additionally, or alternatively, the method 700 may include receiving input at the first user device. In some examples, the input may represent a command to move the first virtual indicator associated with the user account to a second virtual location in the virtual environment. Additionally, or alternatively, the method 700 may include sending, from the first user device and to the network-based communication system, an indication that the first virtual indicator moved from the first virtual location to a second virtual location. Additionally, or alternatively, the method 700 may include determining that the first connection between the second personal communication bridge and the first personal communication bridge has been disbanded based at least in part on the second virtual indicator being outside of the first virtual proximity of the first virtual indicator. Additionally, or alternatively, the method 700 may include determining that a second connection between the first personal communication bridge and a third personal communication bridge of a third user device associated with a third user account has been established. In some examples, the third user account may be associated with the third virtual indicator that is within the first virtual proximity radius of the first virtual indicator. In some examples, communication data may be communicated between the first user device and the third user device via the first personal communication bridge and/or the third personal communication bridge.

Additionally, or alternatively, the method 700 may include receiving input at the first user device. In some examples, the input may represent a command to increase the first virtual proximity radius of the first virtual indicator to a second virtual proximity radius of the first virtual indicator. Additionally, or alternatively, the method 700 may include sending from the first user device and to the network-based communication system, an indication that the first virtual proximity radius of the first virtual indicator increased to a second virtual proximity radius of the first virtual indicator. Additionally, or alternatively, the method 700 may include determining that a second connection between the first personal communication bridge and a third personal bridge of a third user device associated with a third user account has been established. In some examples, the third user account may be associated with the third virtual indicator that is within the second virtual proximity radius of the first virtual indicator. In some examples, communication data may be communicated between the first user device and the third user device via the first personal communication bridge and the third personal communication bridge.

Additionally, or alternatively, the method 700 may include receiving input at the first user device. In some examples, the input may represent a command to decrease the first virtual proximity radius of the first virtual indicator to a second virtual proximity radius of the first virtual indicator. Additionally, or alternatively, the method 700 may include sending, from the first user device and to the network-based communication system, an indication that the first virtual proximity radius of the first virtual indicator decreased to a second virtual proximity radius of the first virtual indicator. Additionally, or alternatively, the method 700 may include determining that the first connection between the second personal communication bridge and the first personal communication bridge has been disbanded based at least in part on the second virtual indicator being outside of the second virtual proximity of the first virtual indicator.

Figure 8:
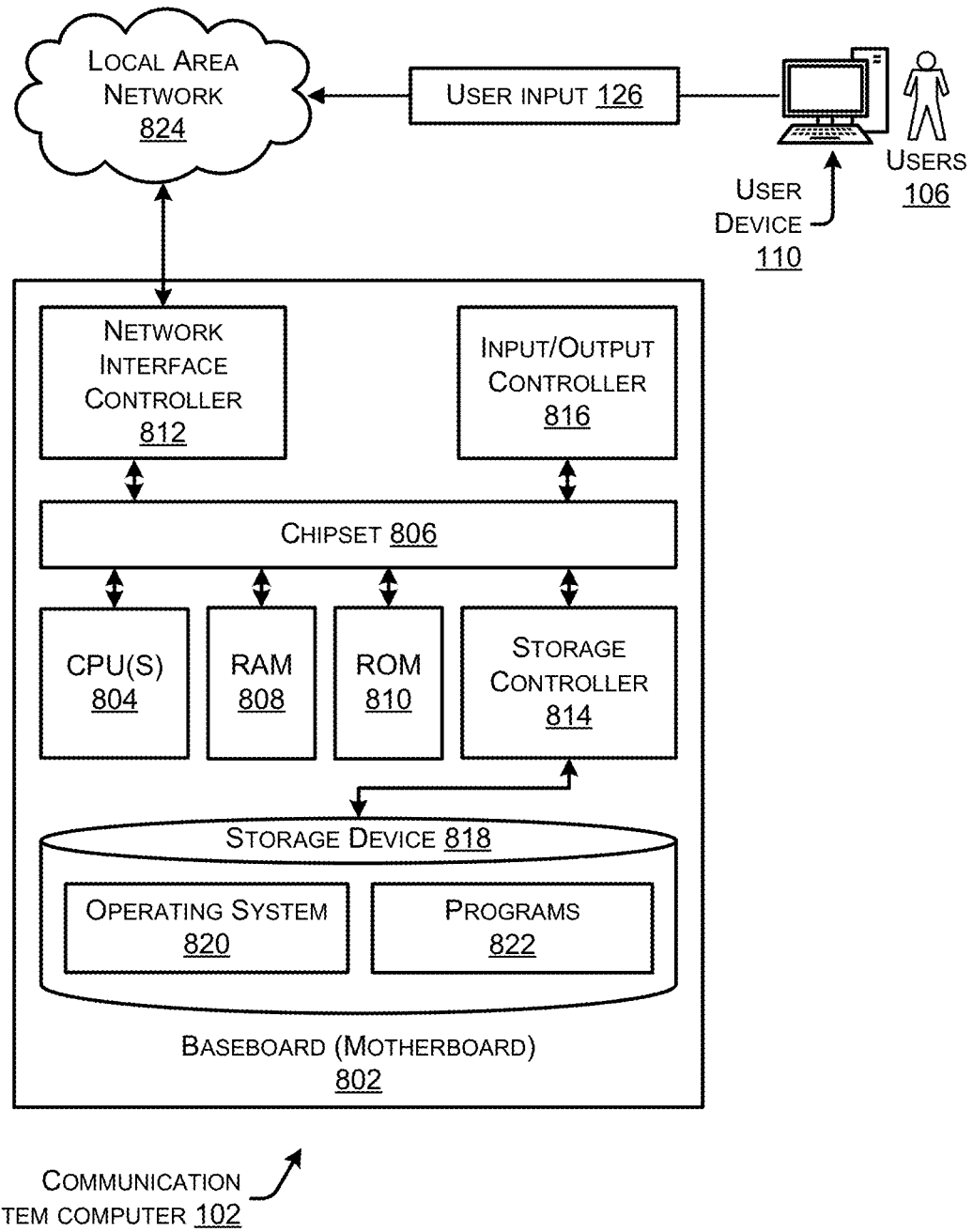
FIG. 8 is a computer architecture diagram showing an illustrative computer hardware architecture for implementing a server device that can be utilized to implement aspects of the various technologies presented herein.

FIG. 8 shows an example computer architecture for a communication system computer 102 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The system computer 102 may, in some examples, correspond to a physical server described herein with respect to FIG. 1.

The computer 102 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 102.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 102. The chipset 806 can further provide an interface to a computer-readable storage medium such as a read-only memory ("ROM") 810 or non-volatile RAM ("NVRAM") for storing basic routines that help to startup the computer 102 and to transfer information between the various components and devices. The ROM 810 or NVRAM can also store other software components necessary for the operation of the computer 102 in accordance with the configurations described herein.

The computer 802 can operate in a networked environment using logical connections to remote computing devices and computer systems through a network, such as the network 824. The chipset 806 can include functionality for providing network connectivity through a NIC 812, such as a gigabit Ethernet adapter. The NIC 812 is capable of connecting the computer 102 to other computing devices over the network 824 (or 104). It should be appreciated that multiple NICs 812 can be present in the computer 102, connecting the computer to other types of networks and remote computer systems.

The computer 102 can be connected to a storage device 818 that provides non-volatile storage for the computer. The storage device 818 can store an operating system 820, programs 822, and data, which have been described in greater detail herein. The storage device 818 can be connected to the computer 102 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 102 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 102 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 102 can further read information from the storage device 818 by detecting the physical states or characteristics of one or more particular locations within the physical storage units.

In addition to the mass storage device 818 described above, the computer 102 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 102. In some examples, the operations performed by the communication system 102, and or any components included therein, may be supported by one or more devices similar to computer 102. Stated otherwise, some or all of the operations performed by the communication system 102, and or any components included therein, may be performed by one or more computer devices 102 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 102. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 102.

In one embodiment, the storage device 818 or other computer-readable storage media is encoded with computer-executable instructions which, when loaded into the computer 102, transform the computer from a general-purpose computing system into a special-purpose computer capable of implementing the embodiments described herein. These computer-executable instructions transform the computer 102 by specifying how the CPUs 804 transition between states, as described above. According to one embodiment, the computer 102 has access to computer-readable storage media storing computer-executable instructions which, when executed by the computer 102, perform the various processes described above with regard to FIGS. 1-7. The computer 102 can also include computer-readable storage media having instructions stored thereupon for performing any of the other computer-implemented operations described herein.

The computer 102 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 102 might not include all of the components shown in FIG. 8, can include other components that are not explicitly shown in FIG. 8, or might utilize an architecture completely different than that shown in FIG. 8.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more computer-readable media storing computer-executable instructions that, when executed by the one or more processors, cause the one or more processors to perform operations comprising:
      receiving, at a network-based communication system and from a first user device associated with a first user account, a request to access a virtual environment;
      providing the first user account with access to a user interface that represents the virtual environment;
      providing a first virtual indicator via the user interface, associated with the first user account, at a first virtual location in the virtual environment, wherein the virtual environment includes a plurality of virtual indicators associated with additional user accounts;
      determining that a second virtual indicator associated with a second user account is within a first virtual proximity radius of the first virtual indicator; and
      based at least in part on the second virtual indicator being within the first virtual proximity radius, sending first communication data from a second user device associated with the second user account to the first user device via a first personal communication bridge;
      determining that the first virtual indicator is outside of a second virtual proximity radius of the second virtual indicator; and
      based at least in part on determining that the first virtual indicator is outside of the second virtual proximity radius of the second virtual indicator, refraining from sending second communication data from the first user device to the second user device via a second personal communication bridge.

2. The system of claim 1, the operations further comprising:
   providing, to the first user account and from the network-based communication system, a recommendation to move the first virtual indicator to a second virtual location in the virtual environment, wherein at least a third virtual indicator associated with a third user account is within the first virtual proximity radius from the second virtual location;

receiving, at the network-based communication system and from the first user device, an acceptance of the recommendation;

determining, based at least in part on the first virtual indicator moving to the second location, that the second virtual indicator is outside the first virtual proximity radius of the first virtual indicator;

based at least in part on the second virtual indicator being outside the first virtual proximity radius of the first virtual indicator, disbanding a connection between the second personal communication bridge and the first personal communication bridge;

determining that the third virtual indicator associated with the third user account is within the first virtual proximity radius of the first virtual indicator; and based at least in part on the third virtual indicator being within the first virtual proximity radius, connecting the first personal communication bridge to a third personal communication bridge associated with a third user account, wherein data can be communicated between the first user device and a third user device associated with the third user account via at least one of the first personal communication bridge and the third personal communication bridge.

3. The system of claim 2, the operations further comprising:

generating a first context associated with the first user account, the first context based at least in part on first content associated with the first user account, the first content including at least one of:
  a first conversation history;
  a first spoken language;
  a first accent;
  a first gender;
  a first speech style;
  a first connection quality; or
  first social media data;

generating a second context associated with the third user account, the second context based at least in part on second content associated with the third user account, the second context including at least one of:
  a second conversation history;
  a second spoken language;
  a second accent;
  a second gender;
  a second speech style;
  a second connection quality; or
  second social media data;

determining a level of similarity between the first context and the second context;

determining that the level of similarity satisfies a threshold level of similarity; and generating the recommendation based at least in part on the level of similarity satisfying the threshold level of similarity.

4. The system of claim 3, wherein the first conversation history and the second conversation history are at least one of:
  a short-lived conversation history including a most recent conversation associated with the first user account or the third user account; or
  a long-lived conversation history including multiple conversations associated with the first user account or the third user account.

5. The system of claim 1, the operations further comprising:

analyzing a conversation represented by at least one of the first communication data associated with the first personal communication bridge or the second communication data associated with the second personal communication bridge;

determining, based at least in part on analyzing the conversation, a topic of the conversation;

identifying a third user account having preferences that correspond to the topic of the conversation; and providing, to the third user account and from the network-based communication system, a recommendation to join the conversation based at least in part on the third user account having preferences that correspond to the topic of the conversation.

6. The system of claim 1, the operations further comprising:

receiving, at the network-based communication system and from the first user device, user input representing a command to increase the first virtual proximity radius of the first virtual indicator to a second virtual proximity radius of the first virtual indicator;

determining that a third virtual indicator associated with a third user account is within the second virtual proximity radius of the first virtual indicator; and based at least in part on the third virtual indicator being within the second virtual proximity radius, connecting the first personal communication bridge to a third personal communication bridge associated with a third user account, wherein communication data can be communicated at least to the first user device and from a third user device associated with the third user account via the first personal communication bridge.

7. The system of claim 1, the operations further comprising:

receiving, at the network-based communication system and from the first user device, user input representing a command to decrease the first virtual proximity radius of the first virtual indicator to a second virtual proximity radius of the first virtual indicator;

determining that the second virtual indicator is outside the second virtual proximity radius of the first virtual indicator; and based at least in part on the second virtual indicator being outside the second virtual proximity radius of the first virtual indicator, disbanding a connection between the second personal communication bridge and the first personal communication bridge.

8. The system of claim 1, wherein:
the first personal communication bridge is configured to route the communication data to the first user device and from the second user device associated with the second user account; and
the second personal communication bridge is configured to route the communication data from the first user device and to second user device associated with second user account.

9. A method comprising:

receiving, at a network-based communication system and from a first user device associated with a first user account, a request to access a virtual environment;

providing the first user account with access to a user interface that represents the virtual environment;

providing a first virtual indicator via the user interface, associated with the first user account, at a first virtual location in the virtual environment, wherein the virtual environment includes a plurality of virtual indicators associated with additional user accounts;

determining that a second virtual indicator associated with a second user account is within a first virtual proximity radius of the first virtual indicator; and based at least in part on the second virtual indicator being within the first virtual proximity radius, sending first communication data from a second user device associated with the second user account to the first user device via a first personal communication bridge;

determining whether the first virtual indicator is within a second virtual proximity radius of the second virtual indicator, wherein the second virtual proximity radius is different from the first virtual proximity radius; and based at least in part on determining that the first virtual indicator is within the second virtual proximity radius of the second virtual indicator sending second communication data from the first user device to the second user device via a second personal communication bridge.

10. The method of claim 9, further comprising:

providing, to the first user account and from the network-based communication system, a recommendation to move the first virtual indicator to a second virtual location in the virtual environment, wherein at least a third virtual indicator associated with a third user account is within the first virtual proximity radius from the second virtual location;

receiving, at the network-based communication system and from the first user device, an acceptance of the recommendation;

determining, based at least in part on the first virtual indicator moving to the second location, that the second virtual indicator is outside the first virtual proximity radius of the first virtual indicator;

based at least in part on the second virtual indicator being outside the first virtual proximity radius of the first virtual indicator, disbanding a connection between the second personal communication bridge and the first personal communication bridge;

determining that the third virtual indicator associated with the third user account is within the first virtual proximity radius of the first virtual indicator; and based at least in part on the third virtual indicator being within the first virtual proximity radius, connecting the first personal communication bridge to a third personal communication bridge associated with a third user account, wherein data can be communicated at least to the first user device and from a third user device associated with the third user account via the first personal communication bridge.

11. The method of claim 10, further comprising:

determining first content associated with the first user account, the first content including at least one of:
  a first conversation history;
  a first spoken language;
  a first accent;
  a first gender;
  a first speech style;
  a first connection quality; or
  first social media data;

determining second content associated with the third user account, the second content including at least one of:
  a second conversation history;
  a second spoken language;
  a second accent;
  a second gender;
  a second speech style;
  a second connection quality; or
  second social media data;

determining a level of similarity between the first content and the second content;

determining that the level of similarity satisfies a threshold level of similarity; and generating the recommendation based at least in part on the level of similarity satisfying the threshold level of similarity.

12. The method of claim 11, wherein the first conversation history and the second conversation history are at least one of:
  a short-lived conversation history including a most recent conversation associated with the first user account or the third user account; or
  a long-lived conversation history including multiple conversations associated with the first user account or the third user account.

13. The method of claim 9, further comprising:

receiving, at the network-based communication system and from the first user device, user input representing a command to increase the first virtual proximity radius of the first virtual indicator to a second virtual proximity radius of the first virtual indicator;

determining that a third virtual indicator associated with a third user account is within the second virtual proximity radius of the first virtual indicator; and based at least in part on the third virtual indicator being within the second virtual proximity radius, connecting the first personal communication bridge to a third personal communication bridge associated with a third user account, wherein data can be communicated at least to the first user device and from a third user device associated with the third user account via the first personal communication bridge.

14. The method of claim 9, further comprising:

receiving, at the network-based communication system and from the first user device, user input representing a command to decrease the first virtual proximity radius of the first virtual indicator to a second virtual proximity radius of the first virtual indicator;

determining that the second virtual indicator is outside the second virtual proximity radius of the first virtual indicator; and based at least in part on the second virtual indicator being outside the second virtual proximity radius of the first virtual indicator, disbanding a connection between the second personal communication bridge and the first personal communication bridge.

15. A method comprising:

sending, from a first user device associated with a first user account and to a network-based communication system, a request to access a virtual environment;

receiving, at the first user device and from the network-based communication system, access to a user interface that represents the virtual environment, wherein the virtual environment includes a plurality of virtual indicators associated with additional user accounts;

receiving, via the user interface, a first virtual indicator at a first virtual location in the virtual environment, the first virtual indicator being associated with the first user account and having a first virtual proximity radius, wherein a second virtual indicator associated with a second user account is within the first virtual proximity radius; and determining that a first connection between a first personal communication bridge of the first user device and a second personal communication bridge associated with the second user account has been established, wherein the first connection is configured to send communication data to the first user device and from a second user device associated with the second user account via at least the first personal communication bridge.

16. The method of claim 15, further comprising:

receiving, at the first user device and from the network-based communication system, a recommendation to move the first virtual indicator to a second virtual location in the virtual environment, wherein at least a third virtual indicator associated with a third user account is within the first virtual proximity radius from the second virtual location;

receiving input at the first user device, the input representing an acceptance of the recommendation;

determining that the first connection between the second personal communication bridge and the first personal communication bridge has been disbanded based at least in part on the second virtual indicator being outside of the first virtual proximity of the first virtual indicator; and determining that a second connection between the first personal communication bridge and a third personal communication bridge associated with a third user account has been established, the third user account being associated with the third virtual indicator that is within the first virtual proximity radius of the first virtual indicator, wherein communication data can be communicated between the first user device and a third user device associated with the third user account via the first personal communication bridge and the third personal communication bridge.

17. The method of claim 16, wherein the recommendation is based at least in part on similarity data representing a level of similarity associated with the first user account and the third user account, the similarity data based at least in part on at least one of:

a first conversation history associated with the first user account;

a second conversation history associated with the third user account;

a first connection level associated with the first personal communication bridge;

a second connection level associated with the third personal communication bridge;

first preferences associated with the first user account; and second preferences associated with the second user account.

18. The method of claim 15, further comprising:

receiving input at the first user device via the user interface, the input representing a command to move the first virtual indicator associated with the first user account to a second virtual location in the virtual environment;

sending, from the first user device and to the network-based communication system, an indication that the first virtual indicator moved from the first virtual location to a second virtual location;

determining that the first connection between the second personal communication bridge and the first personal communication bridge has been disbanded based at least in part on the second virtual indicator being outside of the first virtual proximity of the first virtual indicator; and determining that a second connection between the first personal communication bridge and a third personal communication bridge associated with a third user account has been established, the third user account being associated with a third virtual indicator that is within the first virtual proximity radius of the first virtual indicator, wherein the second connection is configured to send the communication data the first user device and from a third user device associated with the third user account via at least the first personal communication bridge.

19. The method of claim 15, further comprising:

receiving input at the first user device via the user interface, the input representing a command to increase the first virtual proximity radius of the first virtual indicator to a second virtual proximity radius of the first virtual indicator;

sending from the first user device and to the network-based communication system, an indication that the first virtual proximity radius of the first virtual indicator increased to a second virtual proximity radius of the first virtual indicator; and determining that a second connection between the first personal communication bridge and a third personal communication bridge associated with a third user account has been established, the third user account being associated with a third virtual indicator that is within the second virtual proximity radius of the first virtual indicator, wherein the second connection is configured to send the communication data to the first user device and from a third user device associated with the third user account via at least the first personal communication bridge.

20. The method of claim 15, further comprising:

receiving input at the first user device via the user interface, the input representing a command to decrease the first virtual proximity radius of the first virtual indicator to a second virtual proximity radius of the first virtual indicator;

sending, from the first user device and to the network-based communication system, an indication that the first virtual proximity radius of the first virtual indicator decreased to a second virtual proximity radius of the first virtual indicator; and determining that the first connection between the second personal communication bridge and the first personal communication bridge has been disbanded based at least in part on the second virtual indicator being outside of the second virtual proximity of the first virtual indicator.

* * * * *